United States Patent
Kim et al.

(10) Patent No.: US 11,955,731 B2
(45) Date of Patent: Apr. 9, 2024

(54) ELECTRONIC DEVICE INCLUDING MULTI-BAND ANTENNA

(71) Applicants: Samsung Electronics Co., Ltd., Gyeonggi-do (KR); Postech Research And Business Development Foundation, Gyeongsangbuk-do (KR)

(72) Inventors: Yeonwoo Kim, Gyeonggi-do (KR); Wonbin Hong, Gyeongsangbuk-do (KR); Junho Park, Gyeongsangbuk-do (KR); Jaehyun Choi, Gyeongsangbuk-do (KR); Sehyun Park, Gyeonggi-do (KR); Sumin Yun, Gyeonggi-do (KR)

(73) Assignees: Samsung Electronics Co., Ltd (KR); Postech Research and Business Development Foundation (KR)

( * ) Notice: Subject to any disclaimer, the term of this patent is extended or adjusted under 35 U.S.C. 154(b) by 336 days.

(21) Appl. No.: 17/364,103

(22) Filed: Jun. 30, 2021

(65) Prior Publication Data

US 2021/0328348 A1 Oct. 21, 2021

Related U.S. Application Data

(63) Continuation of application No. PCT/KR2019/018667, filed on Dec. 27, 2019.

(30) Foreign Application Priority Data

Dec. 31, 2018 (KR) .................. 10-2018-0174313

(51) Int. Cl.
*H01Q 9/04* (2006.01)
*H01Q 5/10* (2015.01)
*H04B 1/38* (2015.01)

(52) U.S. Cl.
CPC ............ *H01Q 9/0407* (2013.01); *H01Q 5/10* (2015.01); *H04B 1/38* (2013.01)

(58) Field of Classification Search
CPC ........... H01Q 1/243; H01Q 1/38; H01Q 5/10; H01Q 9/40; H01Q 9/0407; H04B 1/40; H04B 1/38; H04B 1/3833; H04B 5/0081
See application file for complete search history.

(56) References Cited

U.S. PATENT DOCUMENTS 8,493,274 B2 * 7/2013 Raura ...................... H01Q 1/44
  343/702
10,276,916 B2 * 4/2019 Hasaba ................ H01Q 9/0421
(Continued)

FOREIGN PATENT DOCUMENTS

JP  2008-527773  7/2008
KR  10-55786  8/2011
(Continued)

OTHER PUBLICATIONS

PCT/ISA/210 Search Report issued on PCT/KR2019/018667 pp. 5.
(Continued)

*Primary Examiner* — Tuan H Nguyen
(74) *Attorney, Agent, or Firm* — The Farrell Law Firm, P.C.

(57) ABSTRACT

An electronic device includes a housing including a first plate and a second plate; and a first antenna structure. The first antenna structure includes a board disposed between the first plate and the second plate. The board includes a first surface facing the first plate, a second surface facing the second plate, a plurality of insulating layers stacked on top of each other between the first surface and the second surface, a first conductive layer disposed on the first surface, a second conductive layer disposed on the second surface, a plurality of strips disposed between the plurality of insulating layers, and a plurality of vias connecting at least one or (Continued)

more of the first conductive layer, the second conductive layer, or the plurality of strips to each other and disposed in the plurality of insulating layers. The electronic device further includes a first conductive structure, a second conductive structure, a third conductive structure, and a fourth conductive structure formed as part of the plurality of strips and the plurality of vias; and a wireless communication circuit electrically connected to at least one of the vias and configured to transmit or receive at least one signal having a frequency of 3 GHz to 100 GHz.

15 Claims, 37 Drawing Sheets

(56) References Cited

U.S. PATENT DOCUMENTS

| | | | |
|---|---|---|---|
| 10,819,018 B2 * | 10/2020 | Seo | H05K 1/141 |
| 11,024,938 B2 * | 6/2021 | Moon | H01Q 1/42 |
| 11,114,747 B2 * | 9/2021 | Ham | H05K 1/141 |
| 2004/0004571 A1 | 1/2004 | Adachi et al. | |
| 2004/0056814 A1 | 3/2004 | Park et al. | |
| 2006/0145923 A1 | 7/2006 | Autti | |
| 2011/0115677 A1 | 5/2011 | Rao et al. | |
| 2013/0076580 A1 | 3/2013 | Zhang et al. | |
| 2014/0145879 A1 | 5/2014 | Pan | |
| 2015/0070228 A1 | 3/2015 | Gu et al. | |
| 2015/0303587 A1 | 10/2015 | Pan | |
| 2015/0311594 A1 | 10/2015 | Zhu et al. | |
| 2016/0079672 A1 | 3/2016 | Cerreno | |
| 2017/0012364 A1 | 1/2017 | Yang et al. | |
| 2019/0165478 A1 | 5/2019 | Jo et al. | |

FOREIGN PATENT DOCUMENTS

| | | |
|---|---|---|
| KR | 10-1055786 | 8/2011 |
| KR | 1020120025007 | 3/2012 |

OTHER PUBLICATIONS

PCT/ISA/237 Written Opinion issued on PCT/KR2019/018667 pp. 5.
KR Notice of Patent Grant dated Sep. 13, 2023 issued in counterpart application No. 10-2018-0174313, 5 pages.

* cited by examiner

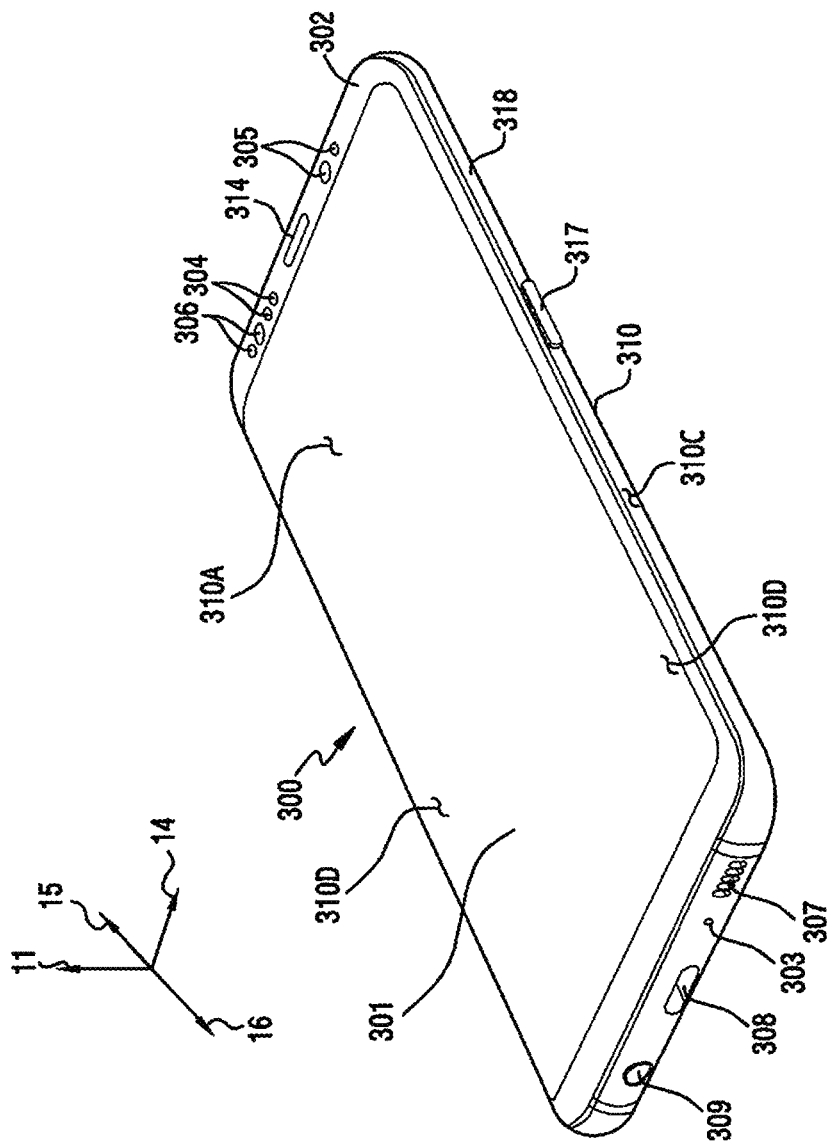

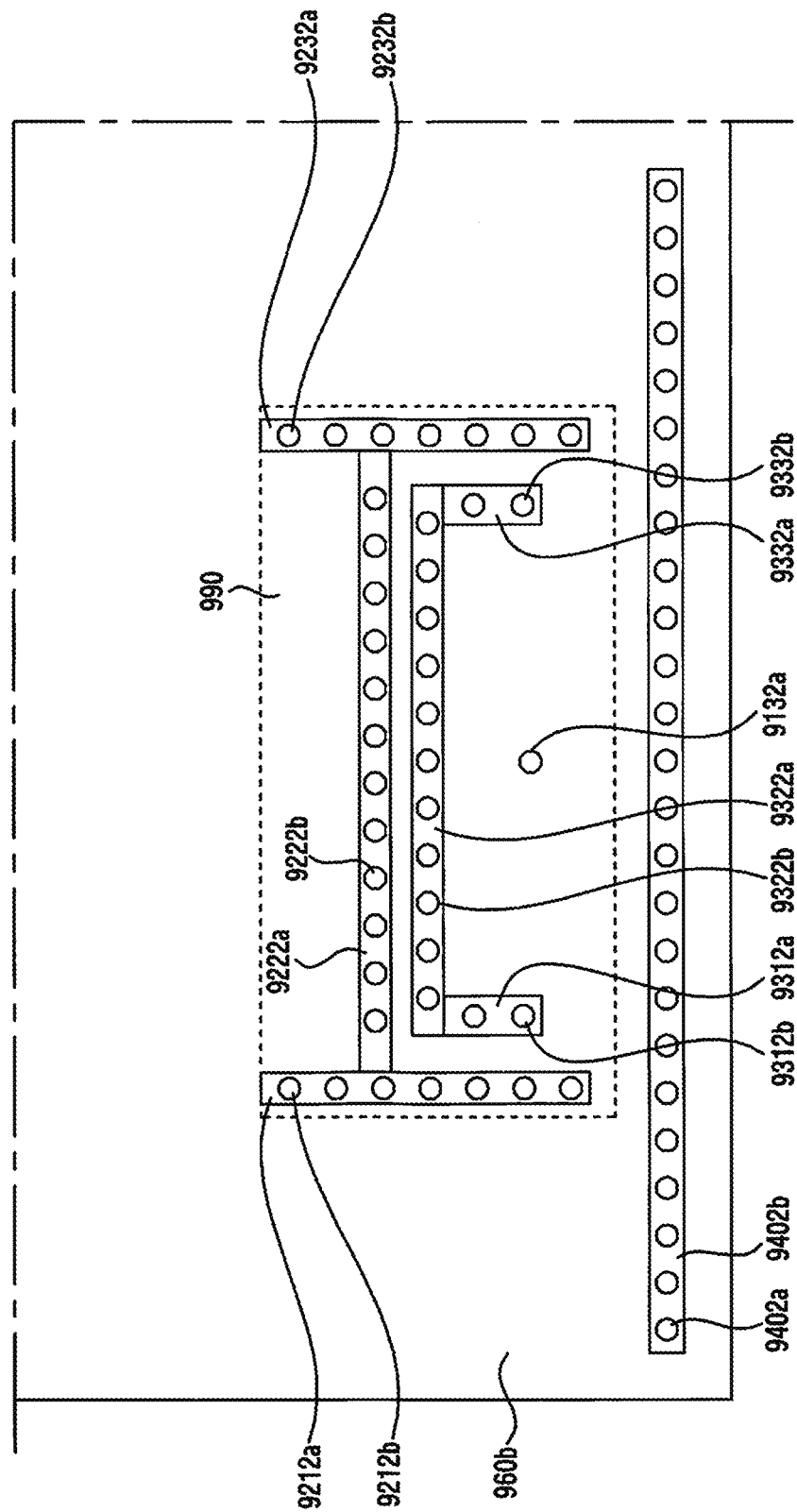

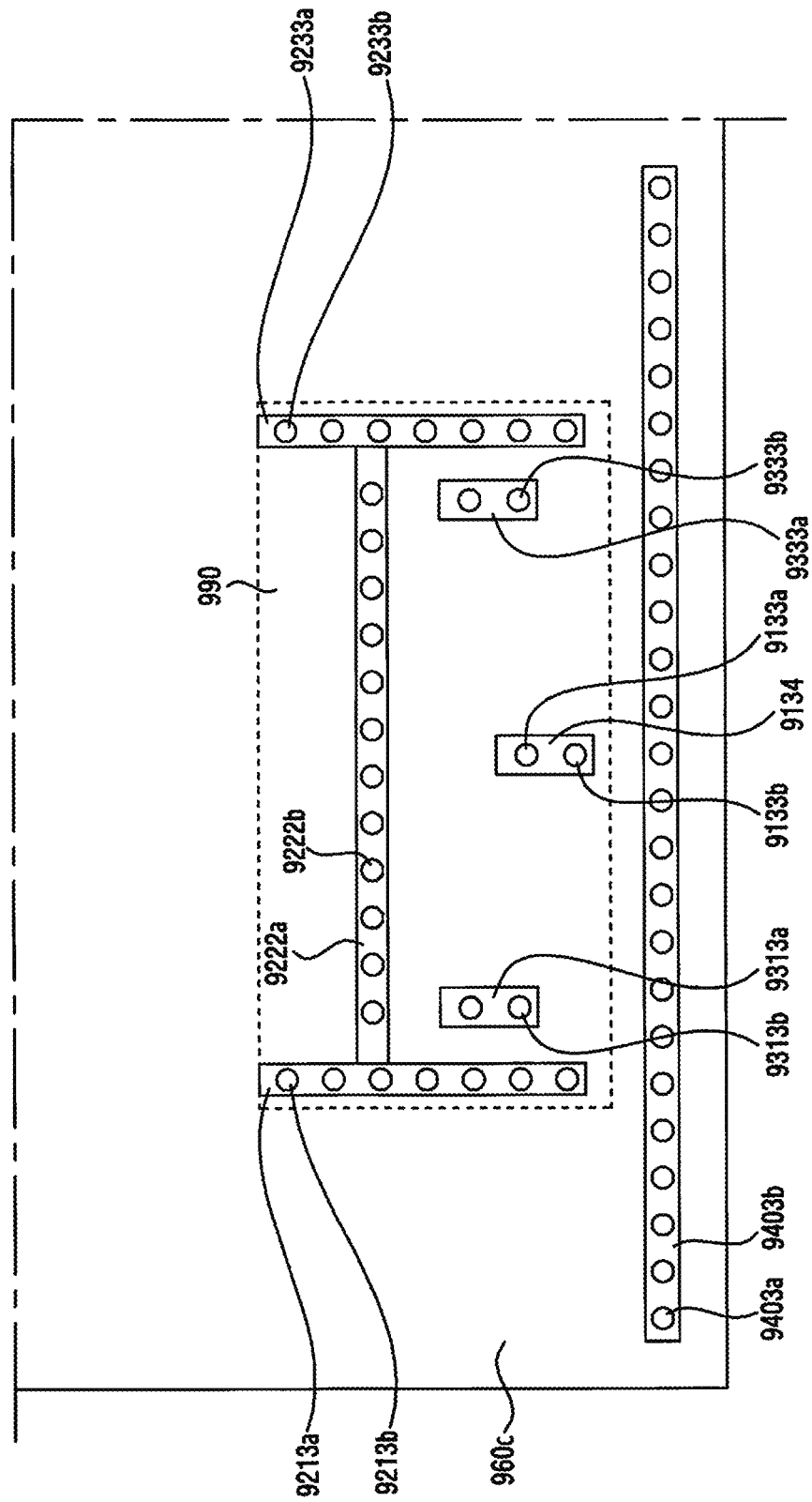

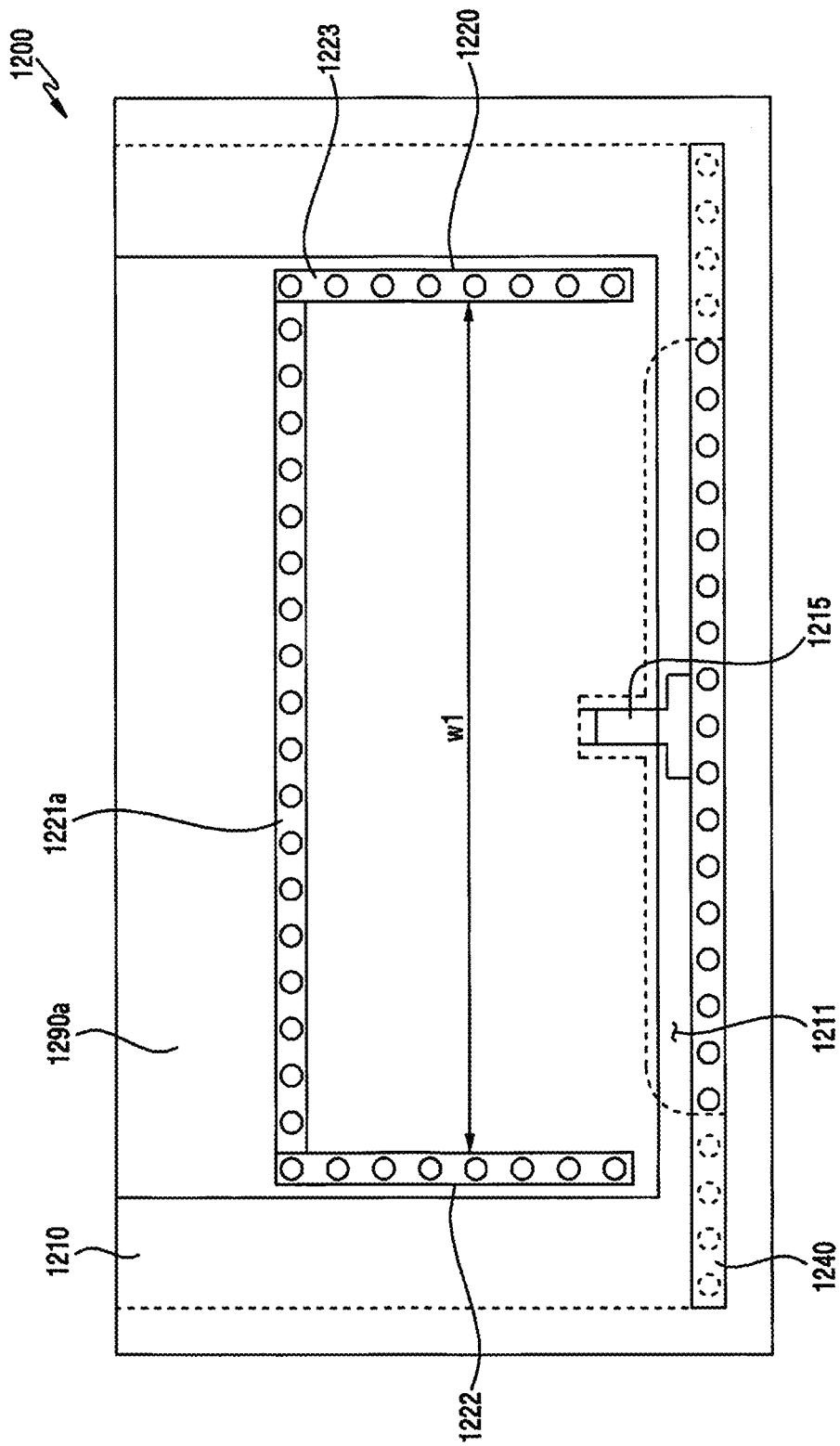

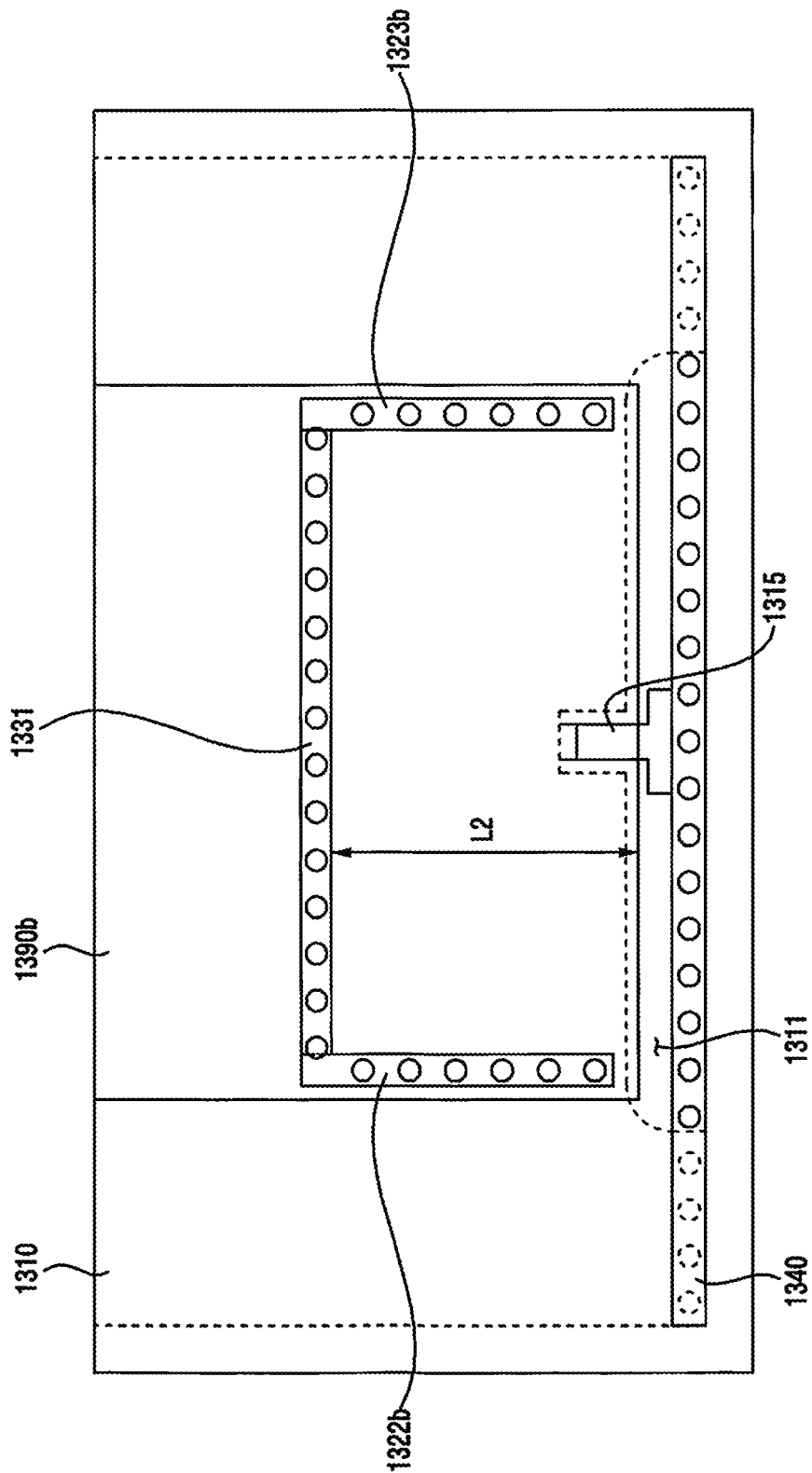

@ 28 GHz

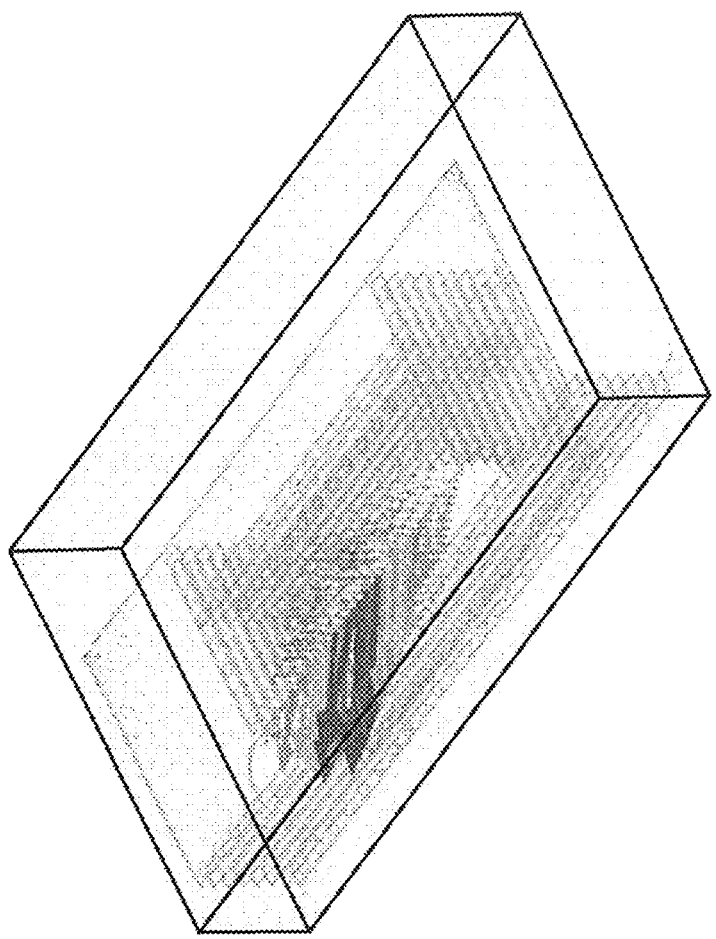
FIG. 15B @ 38 GHz

@ 38 GHz

@ 28 GHz

@ 38 GHz

@ 28 GHz

@ 38 GHz

ELECTRONIC DEVICE INCLUDING MULTI-BAND ANTENNA

CROSS-REFERENCE TO RELATED APPLICATION(S)

This application is a continuation of International Application No. PCT/KR2019/018667, which was filed on Dec. 27, 2019, and is based on and claims priority under 35 U.S.C. § 119 to Korean Patent Application No. 10-2018-0174313, filed in the Korean Intellectual Property Office on Dec. 31, 2018, the entire disclosure of each of which is incorporated herein by reference.

BACKGROUND

1. Field

The present disclosure relates generally to an electronic device including a multi-band array antenna.

2. Description of Related Art

With the development of wireless communication technology, the frequency of using electronic devices (e.g., wireless communication devices and mobile electronic devices) in daily life is increasing, and the use of various contents is increasing. The capacity of a network is reaching its limit due to the increase in capacity following the development of contents, and high-speed communication technologies, such as next-generation wireless communication technologies, are being developed.

In next-generation wireless communication technology, a millimeter wave of 20 gigahertz (GHz) or more may be used substantially, and may be used simultaneously in, for example, a 28 GHz band and a 38 GHz band. Accordingly, mounting one antenna supporting dual bands inside electronic devices that are gradually becoming smaller may be effective in terms of space utilization of the electronic devices.

In order to implement dual bands with an antenna, various methods have been attempted. A patch-type antenna has slots arranged on a patch and is changed to an asymmetric structure, so it may be difficult to implement double polarization. In order to operate such an antenna in multiple bands, it is necessary to separately implement antennas operating in different bands. Thus, the size of the antenna may increase. In addition, when implementing a slot antenna for vertical polarization, it is necessary for the antenna structure to have a height for implementing the slot antenna. Thus, the overall volume of the antenna may increase.

SUMMARY

The present disclosure has been made to address the above-mentioned problems and disadvantages, and to provide at least the advantages described below.

According to an aspect of the present disclosure, an electronic device includes a housing. The housing includes a first plate that is directed outward in a first direction, a second plate that is directed outward in a second direction opposite to the first direction, and a side member that surrounds a space between the first and second plates. The electronic device further includes a first antenna structure located in the space, wherein the first antenna structure includes a first conductive structure including a first conductive layer, which is substantially parallel to the second plate and includes a first edge extending in a third direction perpendicular to the first direction and a first notch portion disposed at the first edge, and a first conductive wall, which is substantially perpendicular to the first conductive layer and includes a second notch portion extending from the first edge and connected to the first notch portion. The electronic device further includes a second conductive structure located in the first notch portion and electrically isolated from the first conductive structure; and a third conductive structure located between the first conductive layer and the first plate and electrically isolated from the first conductive structure and the second conductive structure. The third conductive structure includes a second conductive layer facing the first conductive layer and having a quadrilateral shape, the second conductive layer including a second edge extending parallel to the first edge, a third edge extending perpendicular to the second edge, a fourth edge extending parallel to the third edge, and a fifth edge extending parallel to the second edge, wherein a distance to the fifth edge from the first conductive wall is shorter than a distance to the second edge from the first conductive wall, a second conductive wall facing the first conductive wall and extending from the second edge, a third conductive wall connected to the third edge and the second conductive wall and perpendicular to the second conductive layer and the second conductive wall, and a fourth conductive wall connected to the fourth edge and the second conductive wall and perpendicular to the second conductive layer and the second conductive wall. The electronic device further includes a wireless communication circuit electrically connected to the second conductive structure and configured to transmit or receive a signal having a frequency of 3 GHz to 100 GHz.

According to another aspect of the present disclosure, an electronic device includes a housing including a first plate and a second plate; and a first antenna structure. The first antenna structure includes a board disposed between the first plate and the second plate. The board includes a first surface facing the first plate, a second surface facing the second plate, a plurality of insulating layers stacked on top of each other between the first surface and the second surface, a first conductive layer disposed on the first surface, a second conductive layer disposed on the second surface, a plurality of strips disposed between the plurality of insulating layers, and a plurality of vias connecting at least one or more of the first conductive layer, the second conductive layer, or the plurality of strips to each other and disposed in the plurality of insulating layers. The electronic device further includes a first conductive structure, a second conductive structure, a third conductive structure, and a fourth conductive structure formed as part of the plurality of strips and the plurality of vias; and a wireless communication circuit electrically connected to at least one of the vias and configured to transmit or receive at least one signal having a frequency of 3 GHz to 100 GHz. The first edge of the first conductive layer includes a first notch portion, the first conductive structure is perpendicular to the first conductive layer and extends from one edge at which the first notch is disposed, the second conductive structure is disposed to be spaced apart from the first notch portion and is electrically connected to the wireless communication circuit, the third conductive structure is spaced apart from the first notch portion and may be coupled with the first conductive layer so as to define a first cavity, and the fourth conductive structure is surrounded by the third conductive structure and is coupled with the first conductive layer so as to define a second cavity.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3B is a perspective view illustrating the rear surface of the electronic device of FIG. 3A, according to an embodiment;

FIG. 9C is a view illustrating strips disposed on a plurality of insulating layers included in the PCB, according to an embodiment;

FIG. 9D is a view illustrating strips disposed on a plurality of insulating layers included in the PCB, according to an embodiment;

FIG. 12A is a plan view illustrating an antenna module according to a width of a cavity, according to an embodiment;

FIG. 13B is a plan view illustrating an antenna module according to a length of a cavity, according to an embodiment;

FIG. 15B is a view in which the intensities of electric fields generated in a specific frequency band are represented by vectors in an antenna module, according to an embodiment;

DETAILED DESCRIPTION

Figure 1:
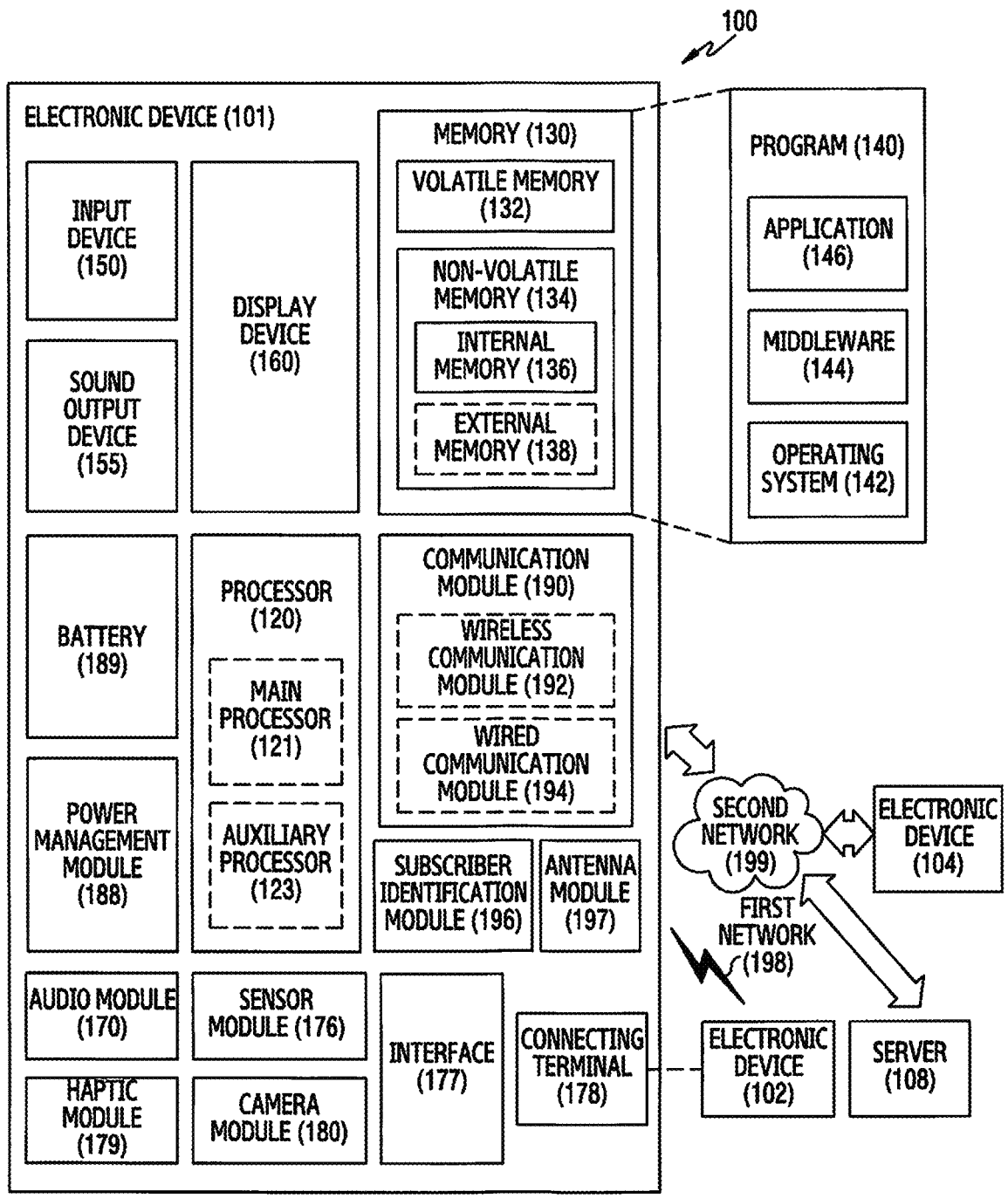
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

An electronic device according to various embodiments of the disclosure may include a multi-band antenna in which a cavity and a slot are defined. By including the cavity, it is possible to implement multiple bands, and by bending a slot portion in the slot antenna, it is possible to provide an efficient mounting space.

Various embodiments of the disclosure are capable of providing an electronic device including a multi-band antenna in which a cavity and a slot are defined.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
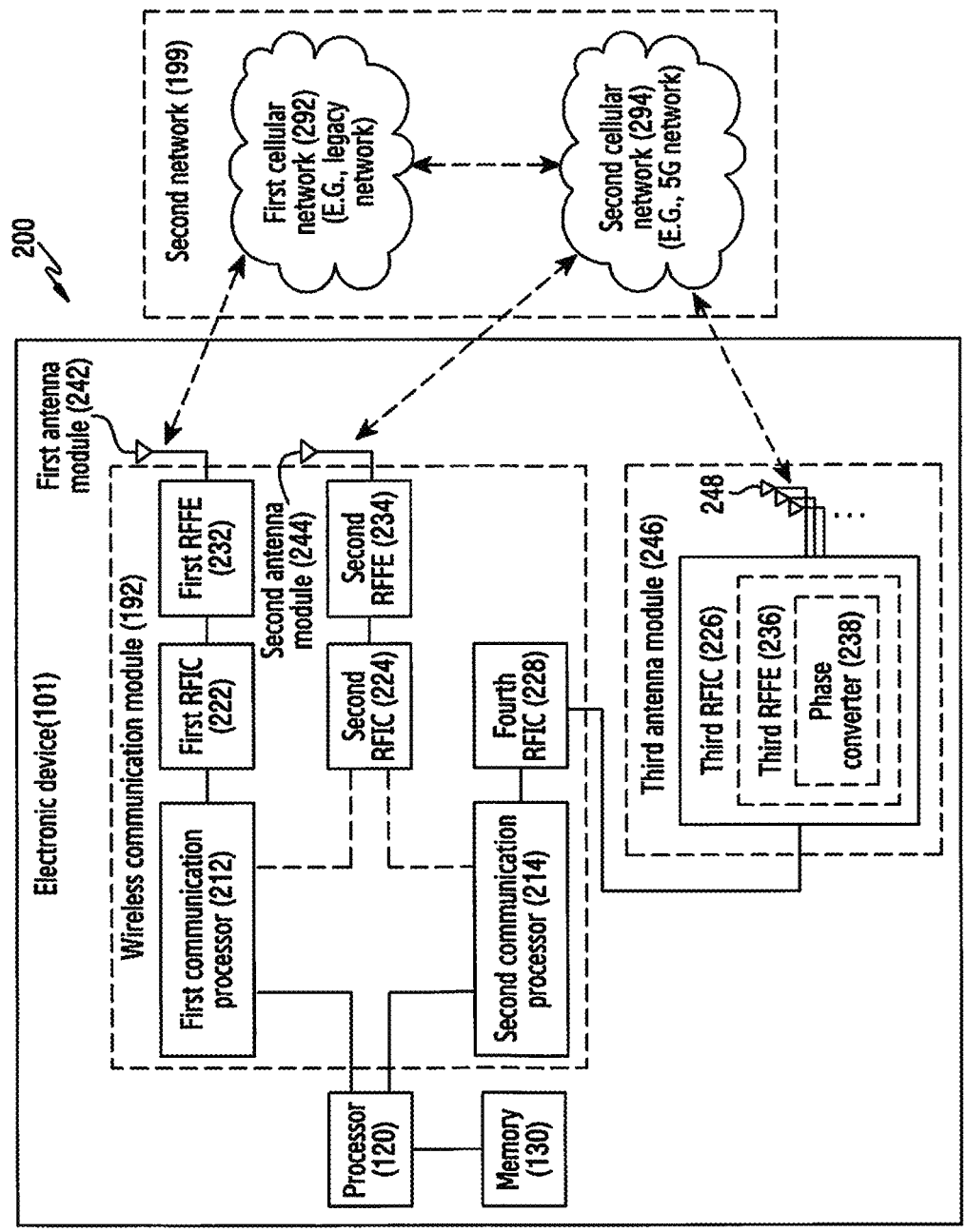
FIG. 2 is a block diagram of an electronic device in a network environment including multiple cellular networks, according to an embodiment.

FIG. 2 is a block diagram 200 illustrating an example electronic device 101 in a network environment including a plurality of cellular networks, according to an embodiment.

Referring to FIG. 2, an electronic device 101 includes a first communication processor 212 (e.g., including processing circuitry), a second communication processor 214 (e.g., including processing circuitry), an RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 further includes a processor 120 (e.g., including processing circuitry) and a memory 130. The second network 199 includes a first cellular network 292 and a second cellular network 294.

The electronic device 101 may further include at least one of the parts shown in FIG. 1 and the second network 199 may further include another network. The first communication processor 212, the second communication processor 214, the first RFIC 222, the second RFIC 224, the fourth RFIC 228, the first RFFE 232, and the second RFFE 234 may form at least a portion of a wireless communication module 192. The fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. The first cellular network may be a legacy network including a $2^{nd}$ generation (2G), $3^{rd}$ generation (3G), $4^{th}$ generation (4G), or long-term evolution (LTE) network. The second communication processor 214 can support establishment of a communication channel corresponding to a designated band (e.g., 6 GHz-60 GHz) to be used for wireless communication with the second cellular network 294 and 5G network communication through the established communication channel.

The second cellular network 294 may be a 5G network that is defined in 3GPP. Further, the first communication processor 212 or the second communication processor 214 can support establishment of a communication channel corresponding to another designated band (e.g., about 6 GHz or less) to be used for wireless communication with the second cellular network 294 and 5G network communication through the established communication channel. The first communication processor 212 and the second communication processor 214 may be implemented in a single chip or a single package. The first communication processor 212 or the second communication processor 214 may be disposed in a single chip or a single package together with the processor 120, the auxiliary processor 123, or the communication module 190. The first communication processor 212 and the second communication processor 214 may be directly or indirectly connected by an interface, thereby being able to provide or receive data or a control signal in one direction or two directions.

The first RFIC 222, in transmission, can convert a baseband signal generated by the first communication processor 212 into a radio frequency (RF) signal of about 700 megahertz (MHz) to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., 6 GHz~60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna 248 and can be preprocessed through the third RFFE 236. The third RFIC 226 can covert the preprocessed 5G Above6 RF signal into a baseband signal so that the preprocessed 5G Above6 RF signal can be processed by the first communication processor 214. The third RFFE 236 may be provided as a portion of the third RFIC 226.

The electronic device 101 may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., 9 GHz~11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna 248 and can be converted into an IF signal by the third RFIC 226. The fourth RFIC 228 can covert the IF signal into a baseband signal so that IF signal can be processed by the second communication processor 214.

The first RFIC 222 and the second RFIC 224 may be implemented as at least a portion of a single chip or a single package. The first RFFE 232 and the second RFFE 234 may be implemented as at least a portion of a single chip or a single package. At least one of the first antenna module 242 or the second antenna module 244 may be omitted, or may be combined with another antenna module and can process RF signals in a plurality of bands.

The third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., 6 GHz~60 GHz) which is used for 5G network communication, due to a transmission line. Accordingly, the electronic device 101 can improve the quality and the speed of communication with the second cellular network 294 (e.g., a 5G network).

The antenna 248 may be an antenna array including a plurality of antenna elements that can be used for beamforming. In this case, the third RFIC 226 may include a plurality of phase shifters 238 corresponding to the antenna elements. In transmission, the phase shifters 238 can convert the phase of a 5G Above6 RF signal to be transmitted to the outside of the electronic device 101 (e.g., transmitted to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and outside network devices.

The second cellular network 294 (e.g., a 5G network) may be operated independently from (e.g., stand-along (SA)) or connected and operated with (e.g., non-SA (NSA)) the first cellular network 292 (e.g., a legacy network). For example, there may only be an access network (e.g., a 5G radio access network (RAN) or a next generation RAN (NG RAN)) and there may be no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 230 and accessed by another part (e.g., the processor 120, the first communication processor 212, or the second communication processor 214).

Figure 3A:
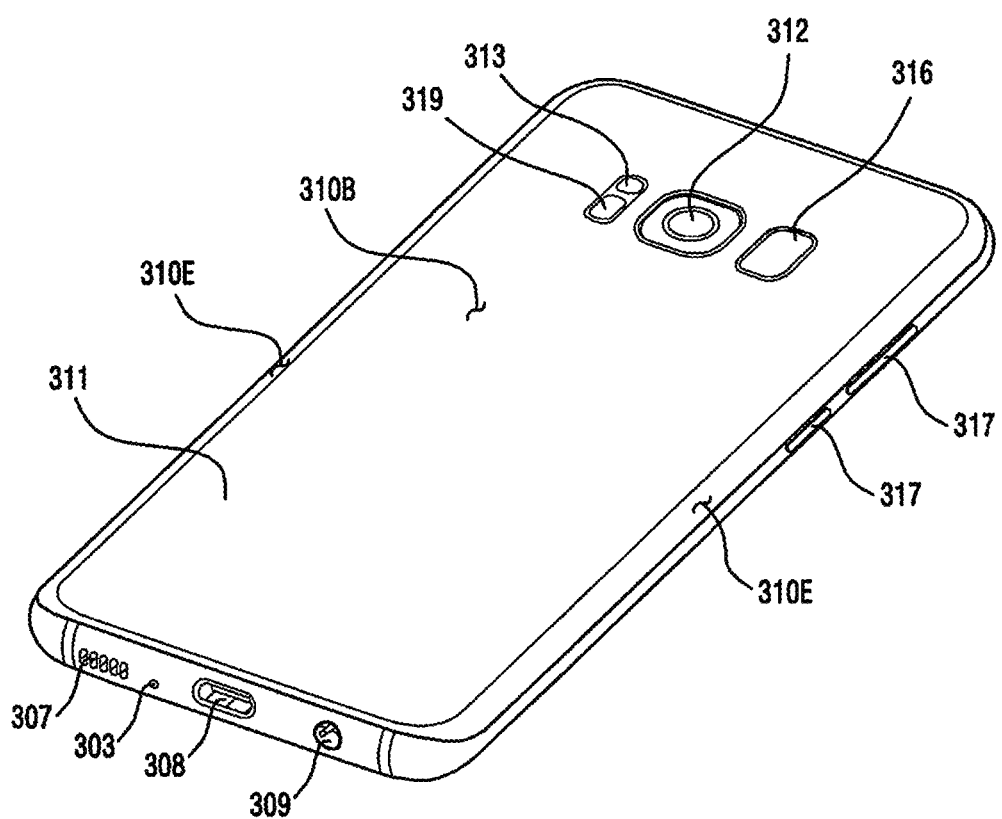
FIG. 3A is a perspective view illustrating the front surface of a mobile electronic device, according to an embodiment.

FIG. 3A is a perspective view illustrating the front surface of a mobile electronic device, according to an embodiment, and FIG. 3B is a perspective view illustrating the rear surface of the electronic device of FIG. 1, according to an embodiment.

Referring to FIGS. 3A and 3B, an electronic device 300 includes a housing 310 including a first surface (or a front surface) 310A, a second surface (or a rear surface) 310B, and a side surface 310C surrounding the space between the first surface 310A and the second surface 310B. The term "housing" may refer to a structure defining a part of the first surface 310A, the second surface 310B, and the side surface 310C of FIGS. 3A and 3B. At least a portion of the first surface 310A may be defined by a substantially transparent front plate 302 (e.g., a glass plate or a polymer plate including various coating layers). The second surface 310B may be defined by a substantially opaque rear plate 311. The rear plate 311 may be made of, for example, coated or colored glass, ceramic, a polymer, a metal (e.g., aluminum, stainless steel (STS), or magnesium), or a combination of two or more of these materials. The side surface 310C may be defined by a side bezel structure 318 (or a "side member") coupled to the front plate 302 and the rear plate 311 and including a metal and/or a polymer. The rear plate 311 and the side bezel structure 318 may be integrally configured, and may include the same material (e.g., a metal material such as aluminum).

In the illustrated embodiment, the front plate 302 includes, at the long opposite side edges thereof, two first areas 310D, which are bent from the first surface 310A toward the rear plate 311 and extend seamlessly. The rear plate 311 includes, at the long opposite side edges thereof, two second areas 310E, which are bent from the second surface 310B toward the front plate 302 and extend seamlessly. The front plate 302 (or the rear plate 311) may include only one of the first areas 310D (or the second areas 310E). Additionally or alternatively, some of the first areas 310D or the second areas 310E may not be included. When viewed from the side of the electronic device 300, the side bezel structure 318 may have a first thickness (or width) on the side surface portions that do not include the first areas 310D or the second areas 310E described above, and may have a second thickness, which is smaller than the first thickness, on the side surface portions that include the first areas 310D or the second areas 310E.

The electronic device 300 may include at least one of a display 301, audio modules 303, 307, and 314, sensor modules 304, 316, and 319, camera modules 305, 312, and 313, key input devices 317, light-emitting elements 306, and connector holes 308 and 309. At least one of the components (e.g., the key input devices 317 or the light-emitting elements 306) may be omitted from the electronic device 300, or other components may be additionally included in the electronic device 300.

The display 301 may be exposed through a substantial portion of, for example, the front plate 302. At least a portion of the display 301 may be exposed through the front plate 302 defining the first surface 310A and the first areas 310D of the side surface 310C. The edges of the display 301 may be configured to be substantially the same as the shape of the edge of the front plate 302 adjacent thereto. The distance between the edge of the display 301 and the edge of the front plate 302 may be substantially constant in order to enlarge the exposed area of the display 301.

Recesses or openings may be configured in some portions of the screen display area of the display 301, and one or more of the audio module 314, the sensor modules 304, the camera modules 305, and the light-emitting elements 306, which are aligned with the recesses or the openings, may be included. The rear surface of the screen display area of the display 301 may include at least one of the audio modules 314, the sensor modules 304, the camera modules 305, the fingerprint sensor 316, and the light-emitting elements 306. The display 301 may be coupled to or disposed adjacent to a touch-sensitive circuit, a pressure sensor capable of measuring a touch intensity (pressure), and/or a digitizer configured to detect a magnetic-field-type stylus pen. At least some of the sensor modules 304 and 319 and/or at least some of the key input devices 317 may be disposed in the first areas 310D and/or the second areas 310E.

The audio modules 303, 307, and 314 may include a microphone hole 303 and speaker holes 307 and 314. The microphone hole 303 may include a microphone disposed therein so as to acquire external sound, and in some embodiments, multiple microphones may be disposed therein so as to enable detection of the direction of sound. The speaker holes 307 and 314 may include an external speaker hole 307 and a phone call receiver hole 314. In some embodiments, the speaker holes 307 and 314 and the microphone hole 303 may be implemented as a single hole, or a speaker may be included therein without the speaker holes 307 and 314 (e.g., a piezo speaker).

The sensor modules 304, 316, and 319 may generate electrical signals or data values corresponding to the internal operating state or the external environmental state of the electronic device 300. The sensor modules 304, 316, and 319 may include, for example, a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module 316 (e.g., a fingerprint sensor) disposed on the second surface 310B of the housing 310. The fingerprint sensor may be disposed not only on the first surface 310A of the housing 310 (e.g., the display 301), but also on the second surface 310B. The electronic device 300 may further include at least one of sensor modules, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

The camera modules 305, 312, and 313 may include a first camera device 305 disposed on the first surface 310A of the electronic device 300 and a second camera device 312 disposed on the second surface 310B thereof, and/or a flash 313. The camera devices 305 and 312 may include one or more lenses, an image sensor, and/or an image signal processor. The flash 313 may include a light-emitting diode or a xenon lamp. Two or more lenses (e.g., an IR camera lens, a wide-angle lens, and a telephoto lens) and image sensors may be disposed on one surface of the electronic device 300.

The key input devices 317 may be disposed on the side surface 310C of the housing 310. The electronic device 300 may not include some or all of the above-mentioned key input devices 317, and a key input device 317, which is not included in the electronic device 300, may be implemented in another form, such as a soft key, on the display 301. A sensor module 316 may be disposed on the second surface 310B of the housing 310.

The light-emitting element 306 may be disposed on the first surface 310A of the housing 310. The light-emitting elements 306 may provide information about the state of the electronic device 300 in an optical form. The light-emitting element 306 may provide a light source that is interlocked with the operation of the camera module 305. The light-emitting elements 306 may include, for example, a light emitting diode (LED), an IR LED, and a xenon lamp.

The connector holes 308 and 309 may include a first connector hole 308, which is capable of accommodating a connector (e.g., a USB connector) for transmitting and receiving power and/or data to and from an external electronic device, and/or a second connector hole 309, which is capable of receiving a connector (e.g., an earphone jack) for transmitting and receiving an audio signal to and from an external electronic device.

Figure 4:
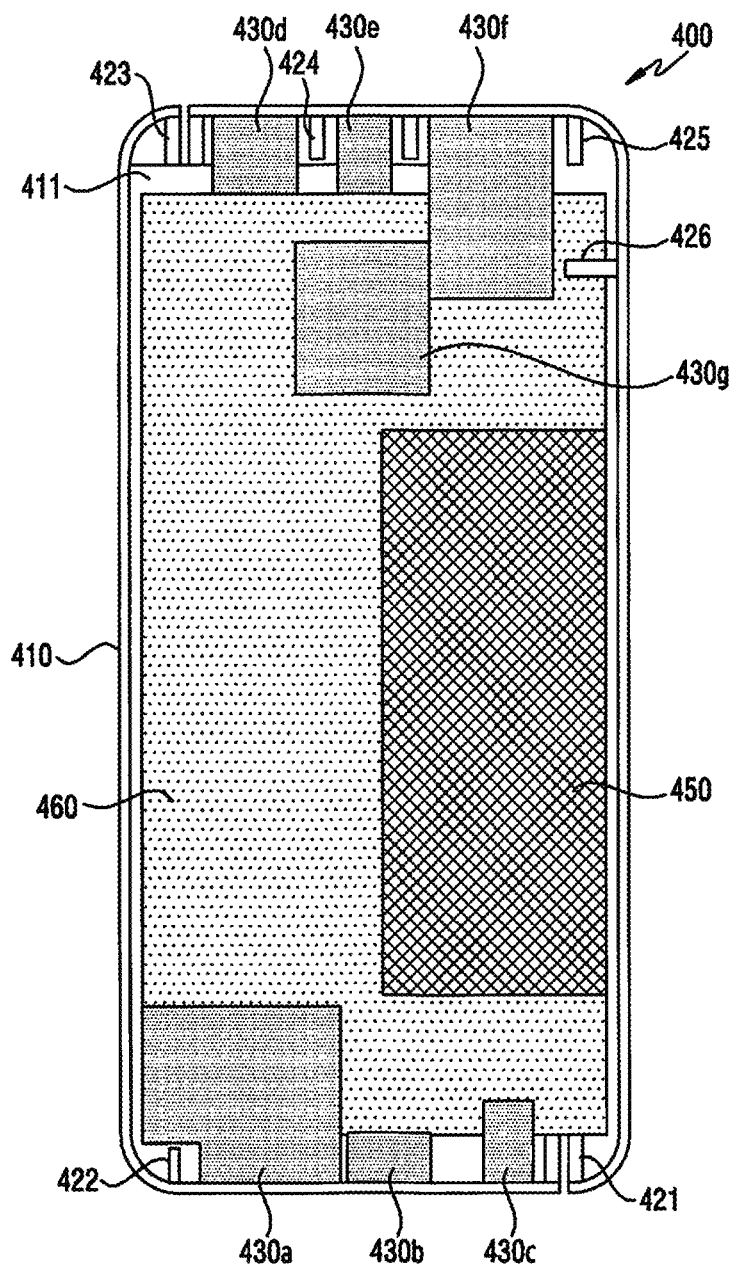
FIG. 4 schematically illustrates the interior of the electronic device in FIG. 3A, according to an embodiment.

FIG. 4 schematically illustrates the interior of the electronic device in FIG. 3A, according to an embodiment.

Referring to FIG. 4, an electronic device 400 includes feeding pieces 421, 422, 423, 424, 425, and 426 for supplying power to at least one antenna module. The antenna module may operate as a multi-band antenna by including a pair of conductive plates disposed on different insulating layers of a PCB 460 and a conductive member disposed therebetween to be supplied with power. A first feeding piece 421 and a second feeding piece 422 are electrically connected to the conductive member of a first antenna to supply power to the first antenna, and a third feeding piece 423 and a fourth feeding piece 424 may be electrically connected to the conductive member of a second antenna to supply power to an auxiliary antenna. A fifth feeding piece 425 and a sixth feeding piece 426 may supply power to an antenna (e.g., a Wi-Fi antenna or a Bluetooth™ antenna) for communication between electronic devices. The electronic device 400 may include a housing 410 that defines an outer surface and an inner space of the electronic device. The feeding pieces 421, 422, 423, 424, 425, and 426 may be disposed to protrude into the inner space 411 along the edges of the housing 410. An antenna device may be located adjacent to the feeding pieces 421, 422, 423, 424, 425 and 426. An antenna device may be disposed around the edges of the housing on which the feeding pieces 421, 422, 423, 424, 425, and 426 are located.

Various electronic components may be included in the inner space of the housing 410, and may include a battery 450, a speaker 430a, an external power interface 403b, an earphone connector hole 430c, a front camera 430d, a receiver 430e, a SIM card slot 403f, or a rear camera 430g. An antenna module may be disposed on the PCB 460 so as to be disposed in the inner space 411 of the housing 410, so that it is possible to increase the efficiency of the mounting space while maintaining performance of the antenna module.

Figure 5:
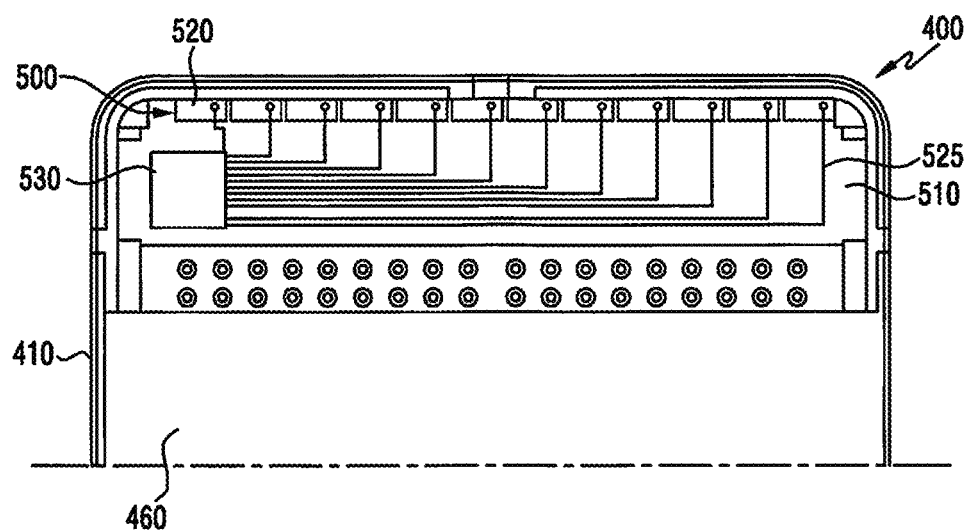
FIG. 5 illustrates an arrangement of an antenna module disposed inside an electronic device, according to an embodiment.

FIG. 5 illustrates an arrangement of an antenna module disposed inside an electronic device, according to an embodiment.

A PCB 460 may be disposed in the inner space 411 of the housing 410. An antenna module 500 may be disposed outside the PCB 460. The antenna module 500 may include at least one communication circuit 530 (e.g., an RFIC) and antenna structures 520. The antenna structures 520 including a pair of conductive plates stacked on a plurality of insulating layers of a board 510 may transmit and/or receive signals via the communication circuit 530. The antenna module 500 may be disposed outside the PCB 460 in the housing 410.

The antenna structures 520 may be arranged side by side. The communication circuit 530 disposed on the board 510 may be connected to a processor disposed on the PCB 460.

The antenna structures 520 constituting the antenna module 500 may be electrically connected to the communication circuit 530 via connecting members 525 disposed on the board 510. The connecting members 525 may be conductive strips formed on the board. The connecting members 525 may include a signal transmission line and a ground line, and may be connected to a ground-signal-ground (GSG) port or a ground-signal (GS) port disposed on the top surface of the board 510. The communication circuit 530 may supply power to the antenna structures 520 or transmit and/or receive signals via the connecting members 525. The communication circuit 530 may provide the signals received via the antenna structures 520 to the processor.

One of the side surfaces of each antenna structure 520 may be oriented to face a portion of the side surface of the housing 410. The antenna structures 520 may have substantially the same structure.

Figure 6A:
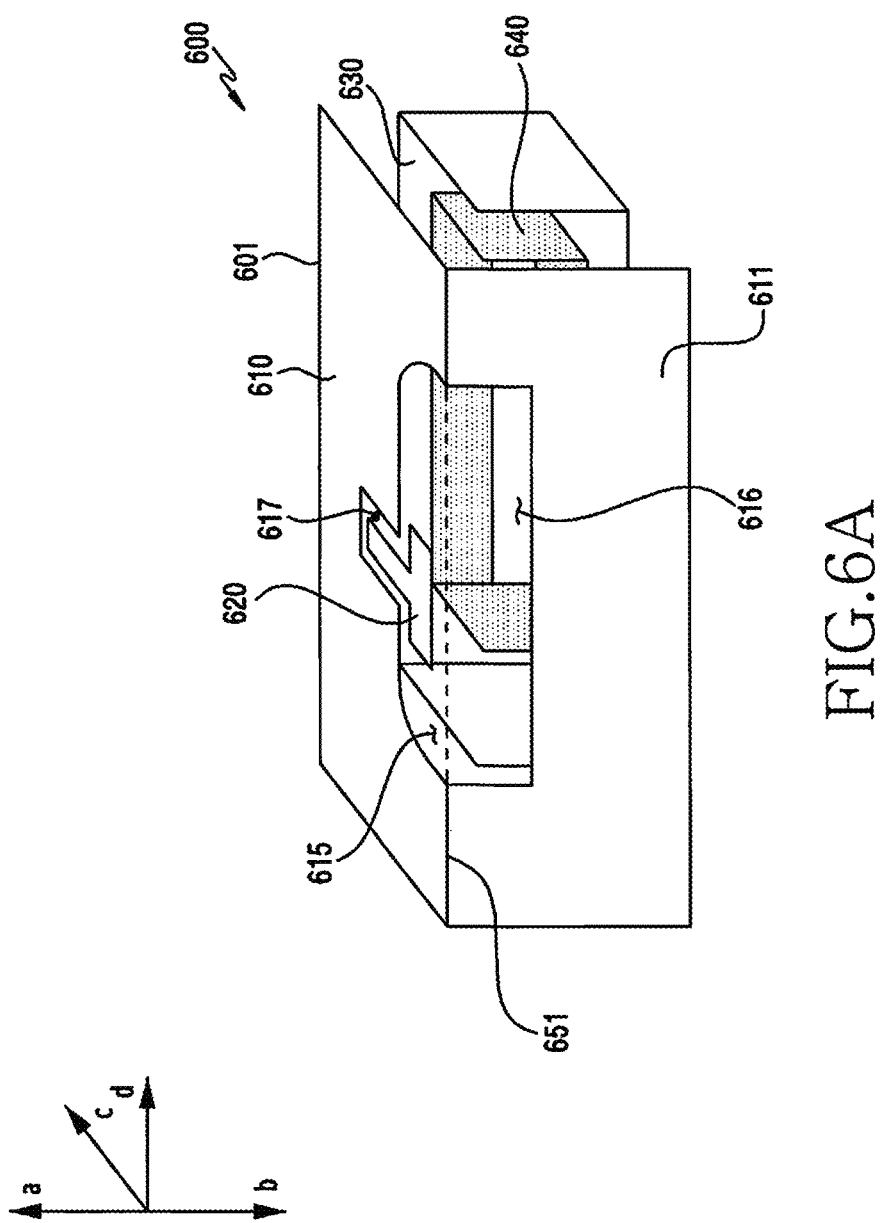
FIG. 6A is a view schematically illustrating an arrangement of an antenna module, according to an embodiment.
Figure 6B:
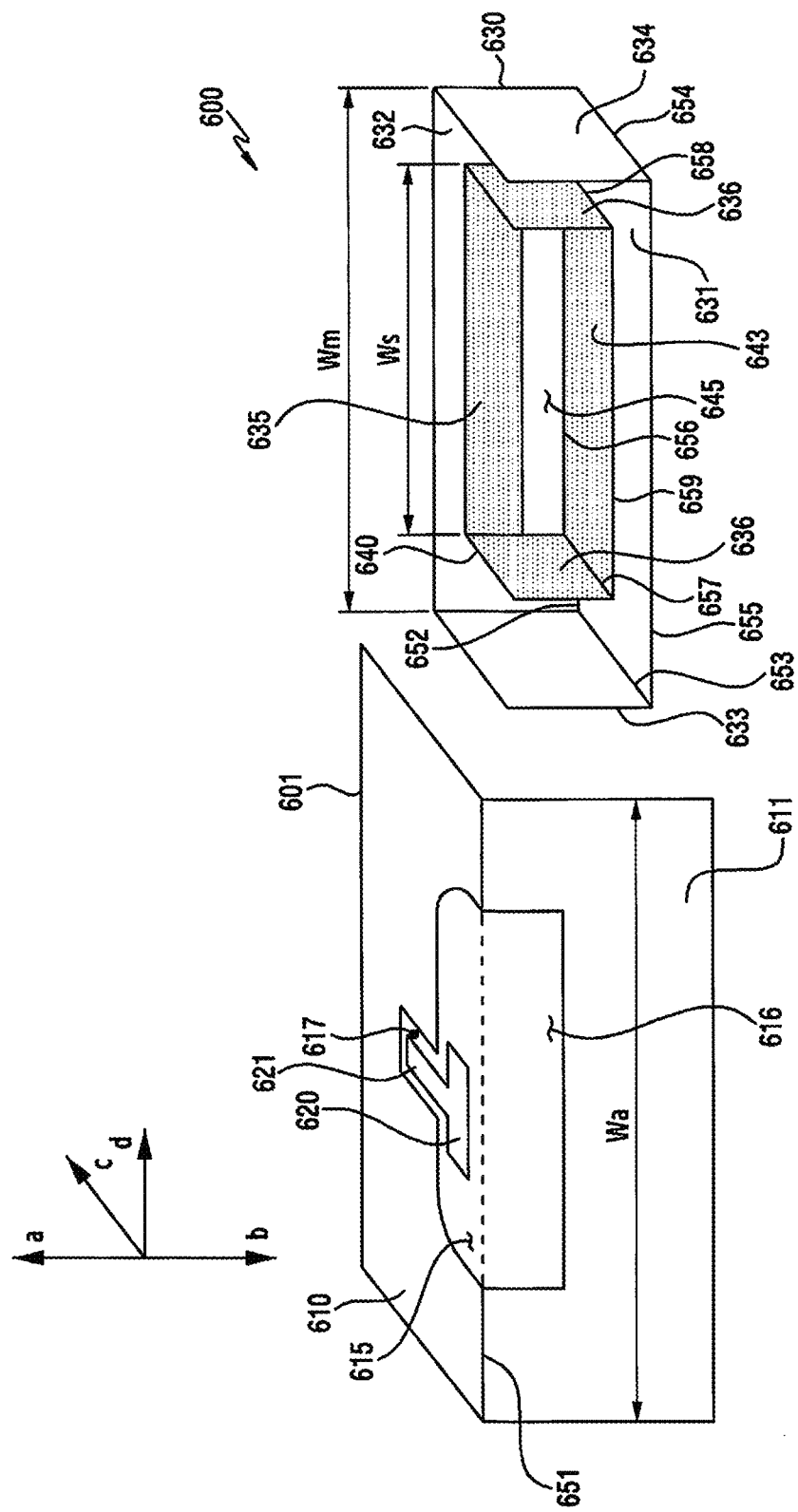
FIG. 6B is a view schematically illustrating an arrangement of an antenna module, according to an embodiment.

FIGS. 6A and 6B schematically illustrate arrangements of an antenna module, according to various embodiments.

Referring to FIGS. 6A and 6B, a first antenna structure 600 includes a first conductive structure 601, a third conductive structure 630, or a fourth conductive structure 640.

The first conductive structure 601 may include a first edge 651 extending in a fourth direction d substantially parallel to a second plate (e.g., the second surface 301B in FIG. 3B) and perpendicular to a first direction a. The first conductive structure 601 may include a first conductive layer 610 including a first notch portion 615 formed in the first edge 651. The first conductive structure 600 may include a first conductive wall 611 that is substantially perpendicular to the first conductive layer 610 and extends from the first edge 651. The first conductive structure 600 may include a first conductive wall 611 including a second notch portion 616 connected to the first notch portion 615.

The first edge 651 may be a boundary between the first conductive layer 610 and the first conductive wall 611. The first notch portion 615 may include a slot concavely recessed from the first edge 651 in a third direction c (e.g., a direction perpendicular to the first direction a and the fourth direction d). The second notch portion 616 may include a slot concavely recessed from the first edge 651 into a portion of the first conductive wall 611 in a second direction b (e.g., the direction opposite to the first direction a).

The first antenna structure 600 may be implemented as a PCB including a plurality of conductive layers, an insulative material (e.g., prepreg) between the conductive layers, and a plurality of vias including conductive lines electrically connecting at least some of the conductive layers. For example, the first antenna structure 600 may include a PCB fabricated using a copper clad laminate (CCL) or a flexible copper clad laminate (FCCL).

The first conductive layer 610 may correspond to one of a plurality of conductive layers included in a PCB.

The first antenna structure 600 implemented as a PCB may include a plurality of strips at least partially overlapping a partial area of the first conductive layer 610 when viewed from above the first conductive layer 610, and disposed in different layers, respectively. The first antenna structure 600 may include a plurality of vias electrically connecting the strips disposed in different layers. The first conductive wall 611 may be implemented with a plurality of strips and a plurality of vias.

In the first antenna structure 600 implemented as a PCB, the second notch portion 616 may not include conductive strips and vias.

The first antenna structure 600 may include a second conductive structure 620 disposed in the first notch portion 615 in the first conductive structure 601. The second conductive structure 620 may be physically and/or electrically isolated from the first conductive structure 601. In the first antenna structure 600 implemented as a PCB, a part of the conductive layers disposed on one layer may be configured as the first conductive layer 610, and the other part may be configured as the second antenna structure 620. The second conductive structure 620 may be electrically connected to a wireless communication circuit. The second conductive structure 620 electrically connected to the wireless communication circuit may be a feeding unit (or a feeding pattern) that indirectly supplies power to the first antenna structure 600. The first antenna structure 600 may be electromagnetically coupled to the second conductive structure 620 so as to operate as an antenna radiator configured to transmit and/or receive wireless signals.

The first conductive layer 610 may include a third notch portion 617 further cut from the first notch portion 615. The second conductive structure 620 may include a conductive portion 621 protruding into the third notch portion 617. The second conductive structure 620 may be electrically connected to a communication circuit 530, and may transmit and/or receive signals having a frequency of about 23 GHz to about 45 GHz via the communication circuit. The first antenna structure 600 may be implemented as a multi-band antenna capable of transmitting and receiving signals having a frequency of about 23 GHz and about 40 GHz. The first antenna structure 600 may be capable of transmitting and/or receiving signals having a frequency of about 3 GHz to about 100 GHz through a wireless communication circuit. The first antenna structure 600 may be implemented as a multi-band antenna within the range of about 3 GHz to about 100 GHz via a wireless communication circuit.

The first conductive structure 601 may have a shape bent with respect to the first edge 651. The first conductive structure 601 may generate vertically polarized waves through the first edge 651 defined by bending the first notch portion 615 and the second notch portion 616 disposed in the first edge 651. Also, the size of the first conductive structure 601 may be reduced through bending.

A third conductive structure 630 disposed at a position facing the first conductive layer 610 may be further included. The first conductive structure 601 and the third conductive structure 630 may implement a cavity back slot antenna (CBSA) structure having an end-fire radiation pattern. The third conductive structure 630 may be implemented as a cavity in the CBSA structure, and may be implemented as a first cavity in the first antenna structure 600 including a plurality of cavities. A slot antenna may radiate electromagnetic waves in opposite directions so that the electromagnetic waves may be reflected from the third conductive structure 630 disposed on the surface opposite to the first edge 651 and may be radiated forward. The electromagnetic waves reflected and radiated by the third conductive structure 630 may have a low cross-polarization characteristic. Electromagnetic waves that are radiated and travel in a direction in which the first notch portion 615 and the second notch portion 616 are disposed may be weak in a horizontal polarization characteristic and may have a vertical polarization characteristic.

The third conductive structure 630 may include at least one of a second conductive layer 631, a second conductive wall 632, a third conductive wall 633, or a fourth conductive wall 634.

In the first antenna structure 600 implemented as a PCB, the second conductive layer 631 may be a conductive layer disposed on a layer different from the first conductive layer 610. In the first antenna structure 600 implemented as a PCB, when viewed from above the second conductive layer 631, the second conductive wall 632, the third conductive wall 633, or the fourth conductive wall 634 may at least partially overlap the second conductive layer 610 and may be constituted with a plurality of strips disposed in different layers and a plurality of vias electrically connecting the plurality of strips.

The second conductive layer 631 may include a second edge 652 extending parallel to the first edge 651, a third edge 653 extending perpendicular to the second edge 652, a fourth edge 654 extending parallel to the third edge 653, and a fifth edge 655 extending parallel to the second edge 652, wherein the distance to the fifth edge 655 from the first conductive wall 611 is shorter than the distance to the second edge 652 from the first conductive wall 611, and the second conductive layer 631 may face the first conductive layer 610 and may have a quadrilateral shape.

The second conductive wall 632 may face the first conductive wall 611 and may extend from the second edge 652. The third conductive wall 633 may be connected to the third edge 653 and the second conductive wall 632, and may be perpendicular to the second conductive layer 631 and the second conductive wall 632. The fourth conductive wall 654 may be connected to the fourth edge 654 and the second conductive wall 632, and may be perpendicular to the second conductive layer 631 and the second conductive wall 652. The second conductive layer 631, the second conductive wall 632, the third conductive wall 633, and the fourth conductive wall 634 may constitute the third conductive structure 630.

The shape of the second conductive layer 631 is not limited to a rectangular shape and may have various shapes. The width Wm of the third conductive structure 630 may be narrower than the width Wa of the first conductive structure 601, and the first conductive structure 601 may surround the third conductive structure 630. The second conductive layer 631 of the third conductive structure 630 may be made of a conductive plate. The second conductive wall 632, the third conductive wall 633, and the fourth conductive wall 634 of the third conductive structure 630 may be constituted with conductive strips disposed between a plurality of insulating layers of a board 510 and conductive vias that connect the conductive strips. The third conductive structure 630 may reflect electromagnetic waves transmitted thereto toward a slot defined in the first notch portion 615 and the second notch portion 616 by a conductive member thereof.

The fourth conductive structure 640 may include at least one of a third conductive layer 643, a fifth conductive wall 635, a sixth conductive wall 636, or a seventh conductive wall 637. The fourth conductive structure 640 may be implemented as a second cavity in a CBSA structure having a plurality of cavities.

In the first antenna structure 600 implemented as a PCB, the third conductive layer 643 may be configured as a conductive layer disposed between the first conductive layer 610 and the second conductive layer 631. In the first antenna structure 600 implemented as a PCB, when viewed from above the third conductive layer 643, the fifth conductive wall 635, the sixth conductive wall 636, or the seventh conductive wall 637 may at least partially overlap the third conductive layer 643, and may be constituted with a plurality of strips disposed in different layers and a plurality of vias electrically connecting the plurality of strips.

The third conductive layer 643 may include a sixth edge 656 parallel to the first edge 651, a seventh edge 657 extending in a third direction c perpendicular to the sixth edge 656, an eighth edge 658 extending parallel to the seventh edge 657, and a ninth edge 659 parallel to the sixth edge 656, wherein the distance to the ninth edge 659 from the first conductive wall 611 is shorter than the distance to the sixth edge 656 from the first conductive wall 611. The third conductive layer 643 may have a quadrilateral shape, but is not limited to the quadrilateral shape and may have various shapes.

The fifth conductive wall 635 may face the first conductive wall 611, and may be disposed to be spaced apart from the third conductive layer 643. The sixth conductive wall 636 may be perpendicular to the third conductive layer 643 and the fifth conductive wall 635, and may be connected to the seventh edge 657 and the fifth conductive wall 635. The seventh conductive wall 637 may be perpendicular to the third conductive layer 643 and the fifth conductive wall 635, and may be connected to the eighth edge 658 and the fifth conductive wall 635.

The third conductive layer 643 of the fourth conductive structure 640 may be omitted or may be shared with the second conductive layer 631 of the third conductive structure 630.

The fifth conductive wall 635 of the fourth conductive structure 640 may include an aperture (or an opening) 645 through which an electric field is able to pass. The aperture 645 may be disposed in a portion of the fifth conductive wall 635 of the fourth conductive structure 640. For example, the aperture 645 may be disposed in the center of the fifth conductive wall 635 of the fourth conductive structure 640, or may be disposed below the fifth conductive wall 634 of the fourth conductive structure 640.

In the plurality of insulating layers present in the area corresponding to the aperture 645 of the fourth conductive structure 640, no conductive wire strips or conductive vias may be provided, and only the insulating layers may be stacked.

The third conductive structure 630 may surround the fourth conductive structure 640, and the fourth conductive structure 640 may be disposed in a space surrounded by the third conductive structure 630 and the first conductive structure 610. The width Ws of the fourth conductive structure 640 may be narrower than the width Wm of the third conductive structure 630, and may be disposed between the third conductive structure 630 and the first conductive structure 610. The fourth conductive structure 640 may be in contact with at least one of the third conductive structure 630 and the first conductive structure 610.

An electric field excited from the slot defined by the first notch portion 615 and the second notch portion 616 may be transmitted to the fourth conductive structure 640, and the transmitted electric field may be reflected back to the slot. The electric field transmitted to the fourth conductive wall 634 of the fourth conductive structure 640 may be reflected, and the electric field transmitted to the aperture 645 may be transmitted through the aperture 645 so as to be transmitted to the second conductive wall 632 of the third conductive structure 630. The electric field transmitted to the second conductive wall 632 of the third conductive structure 630 may pass through the aperture 645 and the slot of the fourth conductive structure 640 so as to be radiated to the outside.

The first cavity defined by the third conductive structure 630 and the second cavity defined by the fourth conductive structure 640 may implement the first antenna structure 600 having a dual band radiation characteristic. The third conductive structure 630 and the fourth conductive structure 640 may implement an end-fire radiation pattern, and may implement vertical polarization through the structure of the first conductive structure 601.

The third conductive structure 630 used as the first cavity may be tuned as an antenna having a first frequency characteristic together with the first conductive structure 601, and the fourth conductive structure 630 used as the second cavity may be tuned as an antenna having a second frequency characteristic that is higher than the first frequency together with the first conductive structure 601. Using the resonance modes of different bands generated by the third conductive structure 630 and the fourth conductive structure 640, the first antenna structure 600 may implement a dual-band radiation characteristic. The third conductive structure 630 may have a radiation characteristic of a first frequency band, and the fourth conductive structure 640 may have a radiation characteristic of a second frequency band. The first frequency band may include a range of about 23 GHz to about 33 GHz, and the second frequency band may include a range of about 35 GHz to about 45 GHz, which is higher than the first frequency band.

The first antenna structure 600 may include a PCB including an insulating material at least partially located between the first conductive structure 601, the second conductive structure 620, and the third conductive structure 630. The PCB may include conductive vias defining the first conductive wall 611, the second conductive wall 632, the third conductive wall 633, the fourth conductive wall 634, the fifth conductive wall 635, the sixth conductive wall 636, and the seventh conductive wall 637. Referring to FIGS. 9A to 10E to be described later, the first conductive wall 611, the second conductive wall 632, the third conductive wall 633, the fourth conductive wall 634, the fifth conductive wall 635, the sixth conductive wall 636, and the seventh conductive wall 637 may be constituted with conductive vias and conductive strips.

Figure 7:
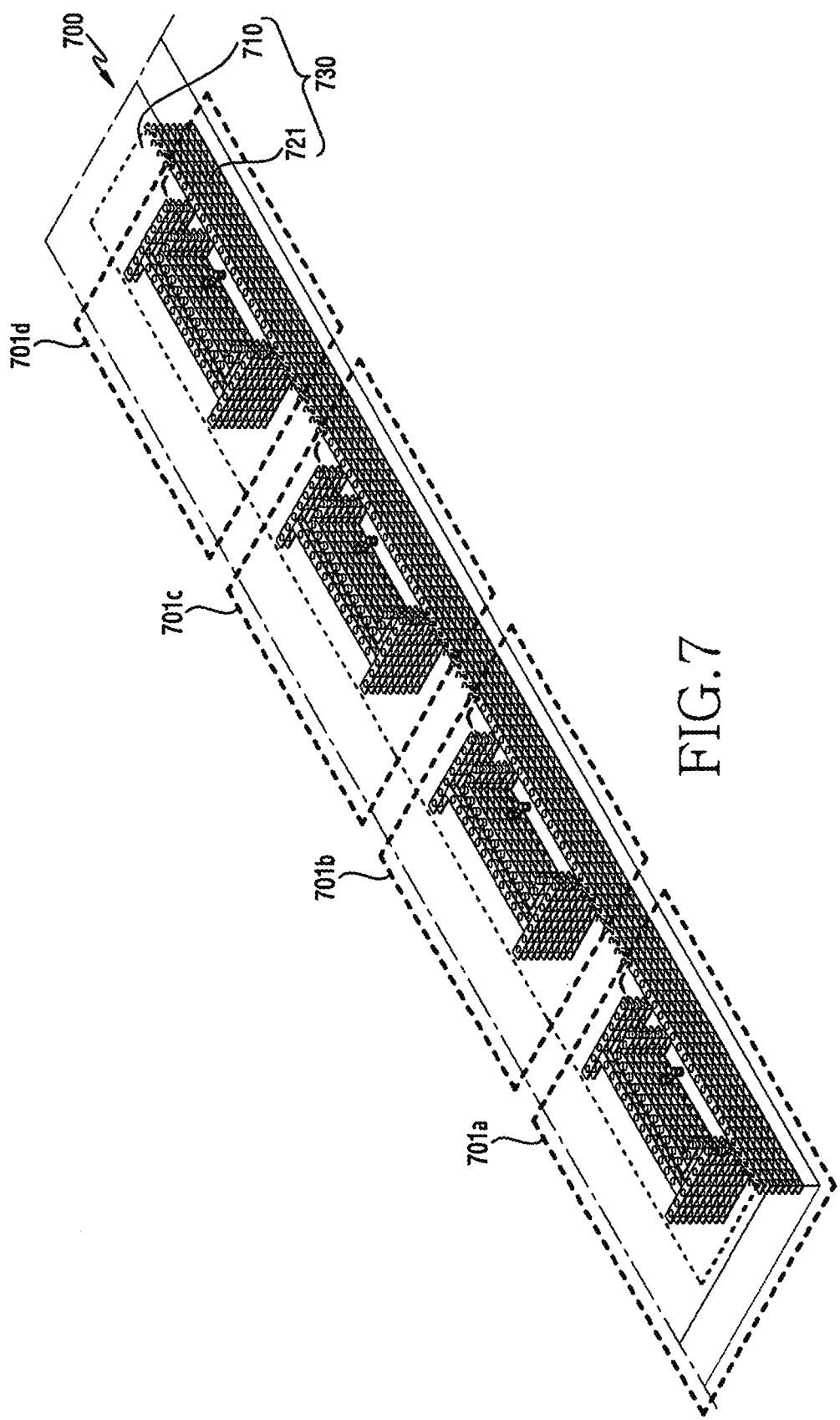
FIG. 7 is a conceptual and exploded view of an antenna module, according to an embodiment.

FIG. 7 is a conceptual and exploded view of an antenna module, according to an embodiment.

Referring to FIG. 7, the antenna module 700 includes at least one of a first antenna structure 701*a*, a second antenna structure 701*b*, a third antenna structure 701*c*, or a fourth antenna structure 701*d*. The antenna module 700 may include a first antenna structure 701*a*, a second antenna structure 701*b*, a third antenna structure 701*c*, a fourth antenna structure 701*d*, or the first antenna structure 600 in FIG. 6B.

The first antenna structure 701*a*, the second antenna structure 701*b*, the third antenna structure 701*c*, or the fourth antenna structure 701*d* may be configured to have substantially the same structure. The first to fourth antenna structures 701*a*, 701*b*, 701*c*, and 701*d* may be aligned in a line. For example, in the electronic device, the first to fourth antenna structures 701*a*, 701*b*, 701*c*, and 701*d* may be aligned along one edge of a side member (e.g., the side surface 310C in FIG. 3A). The antenna module 700 may further include an additional antenna structure by having an additional antenna structure disposed on the side surface of the first antenna structure 701*a* or the fourth antenna structure 701*d*.

The first to fourth antenna structures 701*a*, 701*b*, 701*c*, and 701*d* of the antenna module 700 may share the first conductive structure 730. For example, a first conductive wall 721 and a first conductive layer 710 may be used as the first conductive structure 630 for the first to fourth antenna structures 701*a*, 701*b*, 701*c*, and 701*d*.

Figure 8A:
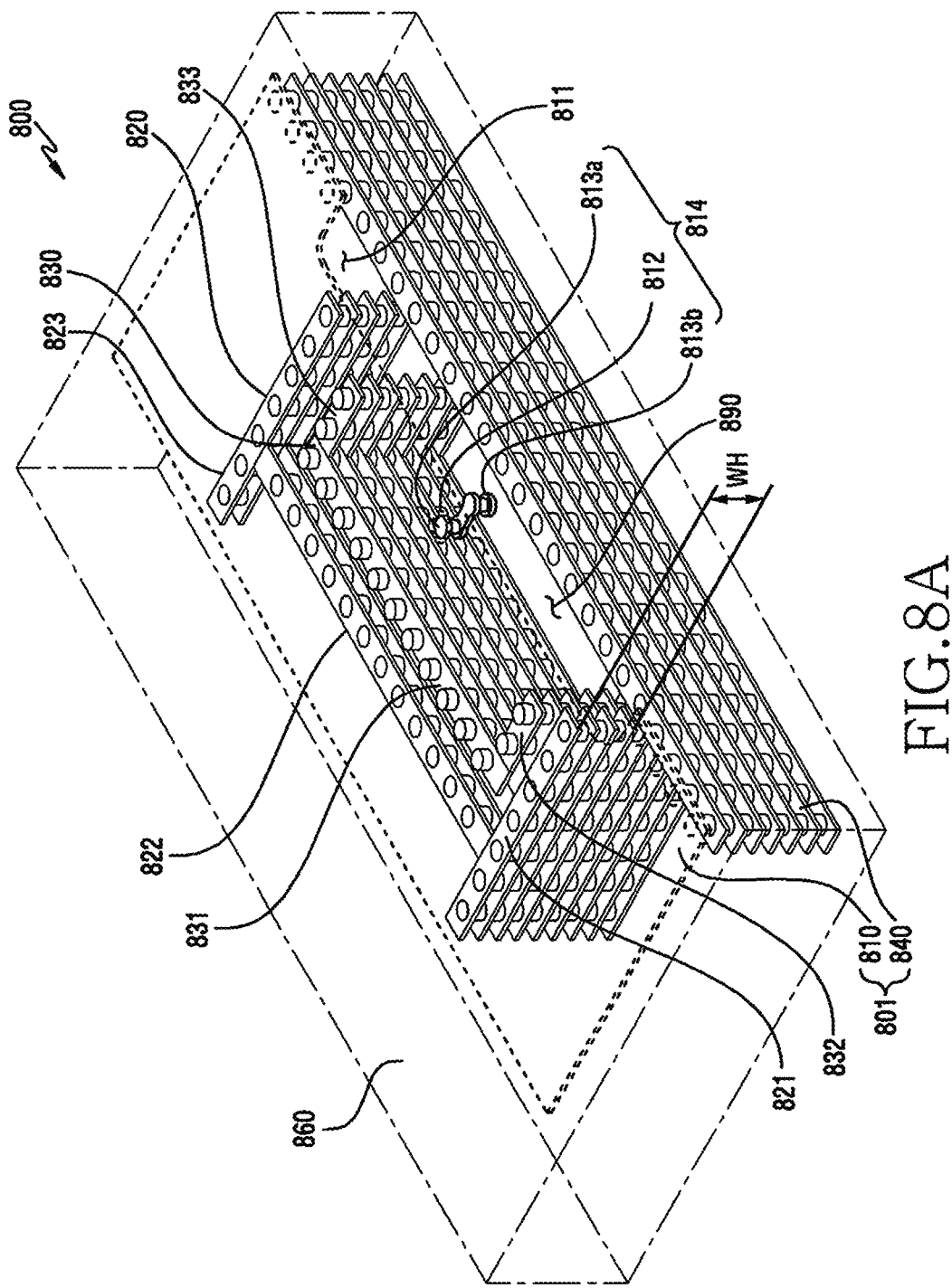
FIG. 8A is a perspective view of a printed circuit board (PCB) including an antenna module, according to an embodiment.
Figure 8B:
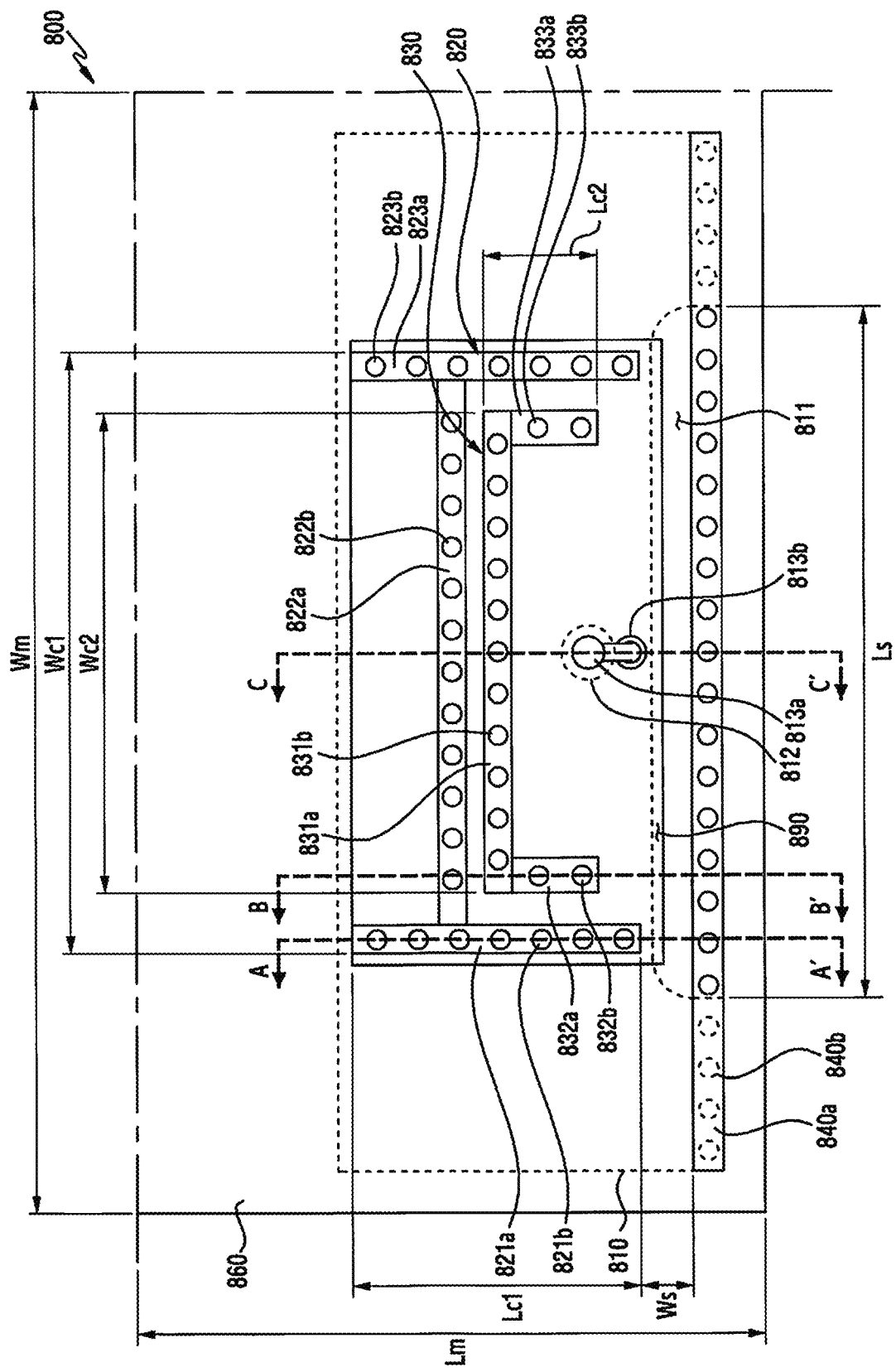
FIG. 8B is a plan view of the PCB including an antenna module, according to an embodiment.

FIG. 8A is a perspective view of a PCB including an antenna module, according to an embodiment, and FIG. 8B is a plan view of the PCB including an antenna module, according to an embodiment.

Referring to FIGS. 8A and 8B, a first antenna structure 800 includes at least one of a board 860, a first conductive layer 810, a second conductive layer 890, a first conductive structure 801, a second conductive structure 814, a third conductive structure 820, or a fourth conductive structure 830.

The board 860 may include a plurality of insulating layers, and may extend from an edge of a main PCB 460, or may be provided as a separate board. When provided as a separate board, a communication circuit 530 included in the board 510 may be electrically connected to the main PCB 460 via an electrical connection member.

In the board 860, the third conductive structure 820 and the fourth conductive structure 830 may be provided. The third conductive structure 820 may include a first side surface 821 (or a first side wall), a second side surface 822 (or a second side wall), and a third side surface 823 (or a third side wall). The first side surface 821 of the third conductive structure 820 may be constituted with a plurality of first side conductive strips 821*a* and a plurality of first side conductive vias 821*b*. The second side surface 822 of the third conductive structure 820 may be constituted with a plurality of rear conductive strips 822*a* and a plurality of rear conductive vias 822*b*. The third side surface 823 of the third conductive structure 820 may be constituted with a plurality of third side conductive strips 823*a* and a plurality of third side conductive vias 823*b*. The first side conductive strips 821*a*, the second side conductive strips 822*a*, and the third side conductive strips 823*a* of the third conductive structure 820 may be disposed between the insulating layers of the board 860. The insulating layers may include through holes, into which respective vias may be inserted, in the areas in which the first side conductive strips 821*a*, the second side conductive strips 822*a*, and the third side conductive strips 823*a* of the third conductive structure 820 are patterned. The plurality of first side conductive strips 821*a* of the third conductive structure 820 may be electrically connected to each other by the plurality of first side conductive vias 821*b*, and the plurality of third side conductive strips 823*a* may be electrically connected to each other by the plurality of third side conductive vias 823*b* so as to define the first side surface 821 and the third side surface 823 of the third conductive structure 820. The plurality of second side conductive strips 822*a* of the third conductive structure 820 may be electrically connected to each other by the plurality of second side conductive vias 822*b* so as to define the second side surface 822 of the third conductive structure 820.

The fourth conductive structure 830 may include a fifth side surface 832 (or a fourth side wall), a sixth side surface (or a sixth side wall), and a fourth side surface 831 (or a fourth side wall). The fifth side surface 832 and the sixth side surface 833 of the fourth conductive structure 830 may be constituted with a plurality of fifth side conductive strips 832*a*, a plurality of sixth side conductive strips, a plurality of fifth conductive side vias 832*b*, and a plurality of sixth side conductive vias 833*b*. The fourth side surface 831 of the fourth conductive structure 830 may be constituted with a plurality of fourth side conductive strips 831*a* and a plurality of fourth side conductive vias 831*b*. The fourth side conductive strips 831*a*, the fifth side conductive strips 832*a*, and the sixth side conductive strips 833*a* of the fourth conductive structure 830 may be disposed between the insulating layers of the board 860. The insulating layers may include through holes, into which respective vias may be inserted, in the areas in which the fifth side conductive strips 832*a*, the sixth side conductive strips 833*a*, and the fourth side conductive strips 831*a* of the fourth conductive structure 830 are patterned. The plurality of fifth side conductive strips 832*a* and the plurality of sixth side conductive strips 833*a* of the fourth conductive structure 830 may be connected to each other by the plurality of fifth side conductive vias 832*b* and the plurality of sixth side conductive vias 833*b* so as to define the fifth side surface 832 and the sixth side surface 833 of the fourth conductive structure 830. The plurality of fourth side conductive strips 831*a* of the fourth conductive structure 830 may be electrically connected to each other by the plurality of fourth side conductive vias 831*b* so as to define the fourth side surface 831 of the fourth conductive structure 830.

The first antenna structure 800 may include a first conductive plate 810 disposed on the top surface of the board 860 and a second conductive plate 890 disposed on a rear surface of the board 860 facing the first conductive plate 810.

The plurality of first side conductive vias 821*b*, the plurality of second conductive vias 822*b*, and the plurality of third conductive vias 823*b* of the third conductive structure 820 may be disposed between the first conductive plate 810 and the second conductive plate 890, and may electrically connect the first conductive plate 810 and the second conductive plate 890 to each other. The plurality of fourth side conductive vias 831*b*, the plurality of fifth conductive vias 832*b*, and the plurality of sixth conductive vias 833*b* of the fourth conductive structure 830 may be electrically connected to the first conductive plate 810 or the second conductive plate 890.

The first conductive layer 810 may include a first notch portion 811 defined along an edge 651. The first notch portion 811 of the first conductive plate 810 may be implemented as a slot of an antenna structure. The first conductive wall 840 of the first conductive structure 801 may include a plurality of front conductive strips 840*a* and a plurality of front conductive vias 840*b*. The length Ls, the width Ws, and the height Wh of the first notch portion 811 may determine characteristics of the antenna.

The front conductive strips 840*a* may be patterned to extend along edges of the plurality of insulating layers, and the insulating layers may include through holes into which respective vias may be inserted. The front conductive strips 840*a* and the first conductive layer 810 may be electrically connected to each other via a plurality of front conductive vias 840*b*. Some of the front conductive strips 840*a* may not be patterned in the insulating layers adjacent to the first conductive layer 810, and the area in which the front conductive strips 840*a* are not patterned may be an area corresponding to the second notch portion 616 in FIG. 6A or 6B.

A second conductive structure 814 for supplying power to the first antenna structure 800 may be included. The second conductive structure 814 may include a first conductive via 813*a* and/or a second conductive via 813*b*. An end of the first conductive via 813*a* may be disposed inside an opening 812 provided in the first conductive layer 810. The second conductive via 813*b* may be inserted into a through hole provided in the plurality of insulating layers, and may be connected to the first conductive via 813*a* via a conductive strip disposed in one of the insulating layers. The first conductive via 813*a* and the second conductive via 813*b* may act as the second conductive structure 620 of FIG. 6A, and the opening 812 may correspond to the third notch portion 617 of FIG. 6A.

The width Wm of an area in which one antenna of the first antenna structure 800 is disposed may be longer than the width Wc1 of the third conductive structure 820 and the width Wc2 of the fourth conductive structure 830. The width Wc1 of the third conductive structure 820 may be longer than the width Wc2 of the fourth conductive structure 830. The length Lm of the area in which one antenna of the first antenna structure 800 is disposed is longer than the length Lc1 of the third conductive structure 820 and the length Lc2 of the fourth conductive structure 830. The length Lc1 of the third conductive structure 820 may be longer than the length Lc2 of the fourth conductive structure 830: The third conductive structure 820 may surround the fourth conductive structure 830 with a predetermined distance therebetween.

The length Lc1 and the width We 1 of the third conductive structure 820 may be determined such that resonance occurs in the range of a first frequency, and the length Lc2 and the width Wc2 of the fourth conductive structure 830 may be determined such that resonance occurs in the range of a second frequency. The first frequency band may be a relatively low band range compared to the second frequency band.

The length Lc1 and the width We 1 of the third conductive structure 820 and the length Lc2 and the width We 1 of the fourth conductive structure 830 may be determined based on the following operations, described below.

The size of the first notch portion 811 may be set based on the first frequency set in the third conductive structure 820. For example, the length Ls of the first notch portion 811 may be set to half the wavelength. The first frequency and a quality factor (Q factor) may be changed by changing the dimensions of the length Lc1 and the width Wc1 of the third conductive structure 820.

After changing the first frequency and the Q factor, the fourth conductive structure 830 may be located between the first notch portions 811 so as to realize the second frequency. The second frequency and impedance matching may be performed by changing the dimensions of the length Lc2 and the width Wc2 of the fourth conductive structure 830.

After performing the second frequency and impedance matching, the electric field excited in the first notch portion 811 is blocked by the fourth conductive structure 830 and may not be transmitted to the third conductive structure 820. Therefore, it is possible to adjust the strength of the electric field by adjusting the height of the side surface and the height of the rear surface of the fourth conductive structure 830. In the rear surface of the fourth conductive structure 830, the length of the fourth conductive vias 831*b* extending from the first conductive layer 810 to the second conductive layer 890 in order to define an aperture 645 for transmitting an electric field may be shorter than the length of the fifth conductive vias 823*b* or the sixth side conductive vias 833*b*.

Figure 9A:
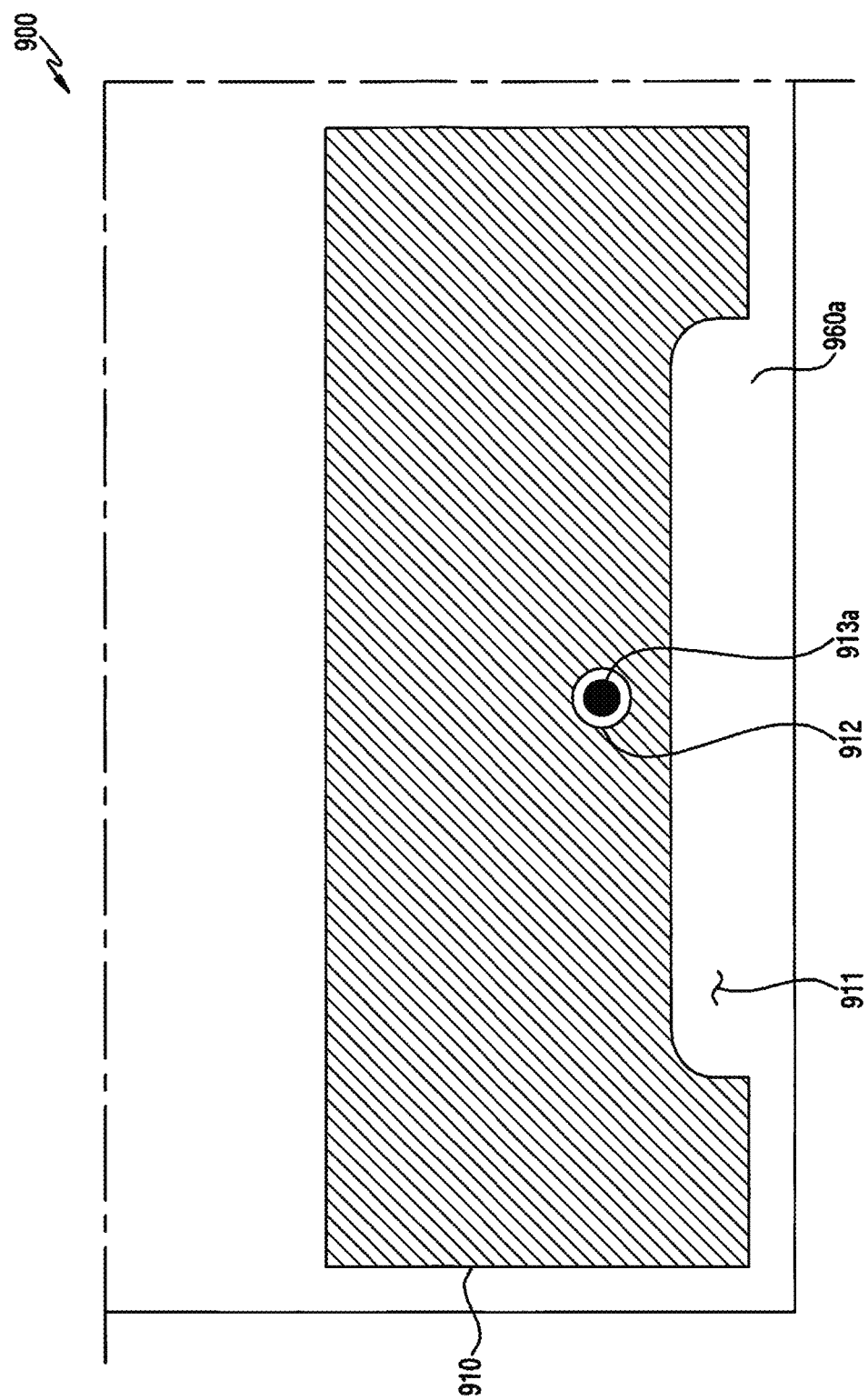
FIG. 9A is a view illustrating a conductive layer disposed on one surface of a PCB including an antenna module, according to an embodiment.
Figure 9B:
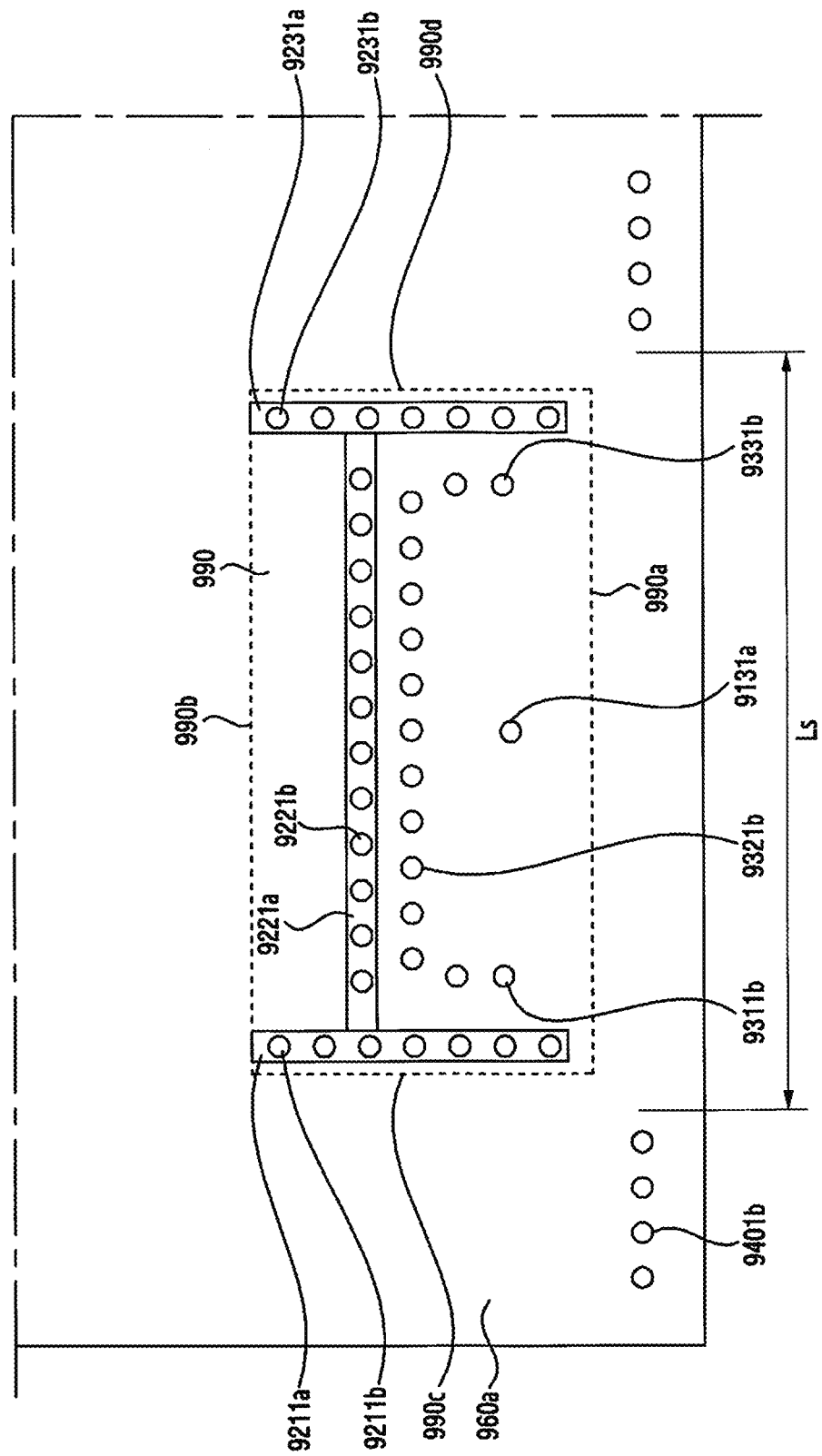
FIG. 9B is a view illustrating strips disposed on a plurality of insulating layers included in the PCB, according to an embodiment.
Figure 9E:
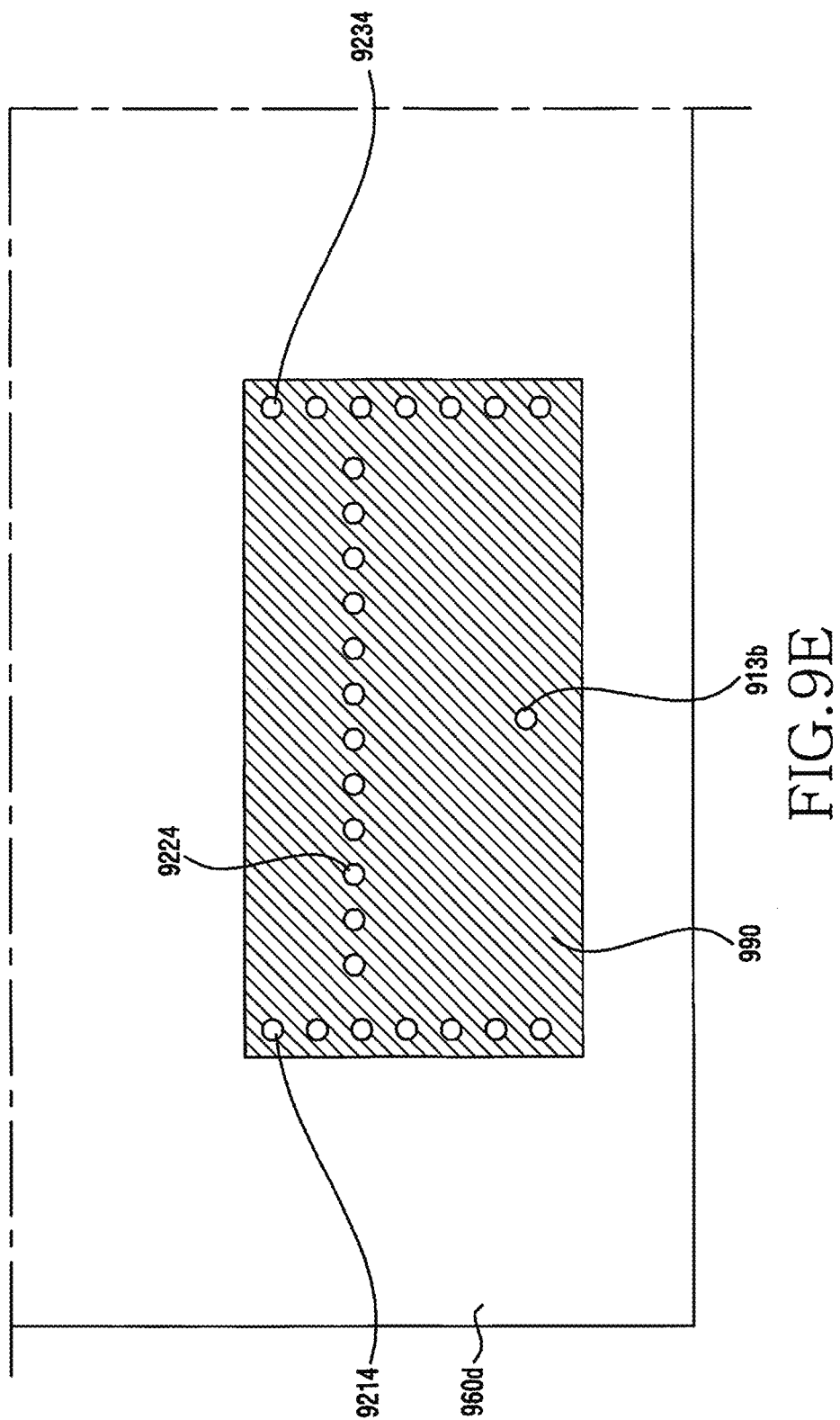
FIG. 9E is a view illustrating a conductive plate disposed on another surface of the PCB, according to an embodiment.

FIG. 9A is a view illustrating a conductive layer disposed on one surface of a PCB including an antenna module, according to an embodiment; FIGS. 9B, 9C, and 9D are views illustrating strips disposed on a plurality of insulating layers included in the PCB, according to various; and FIG. 9E is a view illustrating a conductive layer disposed on another surface of the PCB, according to an embodiment.

Referring to FIG. 9A, on the surface of a first insulating layer 960*a* adjacent to the outermost layer among the plurality of insulating layers, a first conductive layer 910 is disposed. The first conductive layer 910 includes a first notch portion 911. The first conductive layer 910 may be implemented as a slot antenna by combining conductive strips and conductive vias to be described later. The first conductive layer 910 includes an opening 912, and a first conductive via 913*a* for power supply may be disposed in the opening 912.

FIG. 9B illustrates a form in which the first conductive layer 910 disposed on the first insulating layer 960*a* is removed. The first insulating layer 960*a* may include a plurality of conductive strips 9211*a*, 9221*a*, and 9231*a* and a plurality of via holes 9211*b*, 9221*b*, 9231*b*, 9311*b*, 9321*b*, 9331*b*, and 9401*b*. A first side conductive strip 9211*a*, a second side conductive strip 9221*a*, and a third side conductive strip 9231*a*, which correspond to a part of a third conductive structure 820, may be patterned on the first insulating layer 960*a*. A second conductive layer 990 disposed on a lower surface of the third conductive layer may be disposed to overlap the first side conductive strip 9221*a*, the second side conductive strip 9221*a*, and the third side conductive strip 9231*a* when viewed from above the first conductive layer 910. The first side conductive strip 9211*a* may correspond to a portion of the third conductive wall 633 in FIG. 6A, the second side conductive strip 9221*a* may correspond to a portion of the second conductive wall 632 in FIG. 6A, and the third side conductive strip 9231*a* may correspond to a portion of the fourth conductive wall 634 in FIG. 6A.

The second conductive layer 990 may include a first edge 990*a*, and a second edge 990*b* disposed substantially parallel to the first edge 990*a* and facing the first edge 990*a*. The second conductive layer 990 may include a third edge 990*c* extending from one end of the first edge 990*a* to one end of the second edge 990*b*, and a fourth edge 990*d* extending from the other end of the first edge 990*a* to the other end of the second edge 990*b* and disposed substantially parallel to the third edge 990*c*. When viewed from above the second conductive layer 990, the first edge 990*a* of the second conductive layer 990 may overlap the first notch portion 911 in FIG. 9A.

The first side conductive strip 9211*a* and the third side conductive strip 9231*a* may be disposed in a direction perpendicular to the first edge 990*a*, and may be parallel to each other. The first side conductive strip 9211*a* and the third side conductive strip 9231*a* may extend along the third edge 990*c* and the fourth edge 990*d* of the second conductive layer 990, respectively. The second side conductive strip 9221*a* may be a strip that electrically connects the first side conductive strip 9211*a* and the third side conductive strip 9231*a* to each other. The second side conductive strip 9221*a* may be disposed parallel to the first notch portion 911, and may extend from a point of the first side conductive strip 9211*a* to a point of the third side conductive strip 9231*a*. The ends of the second side conductive strip 9221*a* may be disposed at a point of the central area of the first side conductive strip 9211*a* and a point of the central area of the second side conductive strip 9231*a*, respectively. Additionally or alternatively, the ends of the second side conductive strip 9221*a* may be disposed on an end of the first side conductive strip 9211*a* and an end of the third side conductive strip 9231*a*, respectively.

The first side conductive strip 9211*a* may include first side via holes 9211*b*, and the second side conductive strip 9221*a* may include second side via holes 9221*b*. The third side conductive strip 9231*a* may include third side via holes 9231*b*. The first side via holes 9211*b*, the second side via holes 9221*b*, and the third side via holes 9231*b* may also be disposed in the first insulating layer 960*a*. The first insulating layer 960*a* may include the first side via holes 9211*b*, the second side via holes 9221*b*, and the third side via holes 9231*b* in the regions corresponding to the first side conductive strip 9211*a*, the second side conductive strip 9221*a*, and the third side conductive strip 9231*a*. A plurality of conductive vias may be provided in the first side via holes 9211*b*, the second side via holes 9221*b*, and the third side via holes 9231*b*. By the plurality of conductive vias, the first conductive layer 910, the first side conductive strip 9211*a*, the second side conductive strip 9221*a*, and the third side conductive strip 9231*a* may be electrically connected to each other.

The conductive vias inserted into the first side via holes 9211*b* may correspond to a part of the third conductive wall 633 in FIG. 6A, the conductive vias inserted into the second side via holes 9221*b* may correspond to a part of the second conductive wall 6324 in FIG. 6A, and the conductive vias inserted into the third side via holes 9231*b* may correspond to a part of the fourth conductive wall 634 in FIG. 6A.

The front conductive via holes 9401*b*, the fourth side via holes 9311*b*, the fifth side via holes 9321*b*, and the sixth side via holes 9331*b* may be disposed in the first insulating layer 960*a*.

The front conductive via holes 9401*b* may be arranged at an edge of the first conductive layer 960*a* corresponding to the edge of the first conductive layer 910 having the first notch portion 911. The front conductive via holes 9401*b* may not be provided in the area corresponding to the first notch portion 911 of the first conductive layer 910, and the area corresponding to the first notch portion 911, which does not have the front conductive via holes 9401*b*, may be used as an antenna slot. The front conductive via holes 9401*b* may correspond to a part of the first conductive wall 611 in FIG. 6A. A portion corresponding to the length Ls in which a slot is provided may be filled with an insulating material without being provided with the front conductive via holes 9401. The insulating material filled in the portion corresponding to the length in which the slot is provided may correspond to a portion of the second notch portion 616 in FIG. 6B.

The fourth side via holes 9311*b* and the sixth side via holes 9331*b* may be disposed to be spaced apart from the first side via holes 9211*b* and the third side via holes 9231*b*, respectively. The first side via holes 9311*b* and the third side via holes 9331*b* may be disposed between the first side via holes 9211*b* and the third side via holes 9231*b*. The fifth side via holes 9321*b* may be spaced apart from the second side via holes 9221*b*, and may be disposed between the first side via holes 9211*b* and the third side via holes 9231*b*.

The conductive vias inserted into the fourth side via holes 9311*b* may correspond to a part of the sixth conductive side wall 636 in FIG. 6B, the conductive vias inserted into the fifth side via holes 9321*b* may correspond to a part of the fifth conductive side wall 635 in FIG. 6B, and the conductive vias inserted into the sixth side via holes 9331*b* may correspond to a part of the seventh conductive side wall 637 in FIG. 6B.

The conductive vias, which are respectively inserted into the fourth side via holes 9311*b*, the fifth side via holes 9321*b*, the first side via holes 9211*b*, and the sixth side via holes 9221*b*, may be electrically connected to the first conductive layer 610.

FIG. 9C is a view illustrating a second insulating layer 960*b* disposed under the first insulating layer 960*a*, according to an embodiment. The second insulating layer 960*b* may be a layer adjacent to the first insulating layer 960*a*, and second insulating layers 960*b* having the same shape may be repeatedly stacked as a plurality of layers.

Referring to FIG. 9C, the second insulating layer 920*b* includes a plurality of conductive strips 9212*a*, 9222*a*, 9232*a*, 9312*a*, 9322*a*, 9332*a*, and 9402*a* and a plurality of via holes 9212*b*, 9222*b*, 9232*b*, 9312*b*, 9322*b*, 9332*b*, and 9402*b*. A first side conductive strip 9212*a*, a second side conductive strip 9222*a*, and a third side conductive strip 9232*a*, which correspond to a part of the third conductive structures 820, may be patterned on the second insulating layer 960*b*. The first side conductive strip 9212*a*, the second side conductive strip 9222*a*, and the third side conductive strip 9232*a* may be configured to be substantially the same as the strips provided in the first insulating layer 960*a*.

The first side conductive strip 9212*a* may include first side via holes 9212*b*, and the second side conductive strip 9222*a* may include second side via holes 9222*b*. The third side conductive strip 9232*a* may include third side via holes 9232*b*. The first side via holes 9212*b*, the second side via holes 9222*b*, and the third side via holes 9232*b* may also be disposed in the second insulating layer 960*b*. The fourth side via holes 9312*b*, the fifth side via holes 9322*b*, and the sixth side via holes 9332*b* may be disposed in the second insulating layer 960*b*. When viewed from above the second insulating layer 960*b*, the first side via holes 9212*b*, the second side via holes 9222*b*, the third side via holes 9232*b*, the fourth side via holes 9312*b*, the fifth side via holes 9322*b*, and the sixth side via holes 9332*b* may at least partially overlap the plurality of via holes 9211*b*, 9221*b*, 9231*b*, 9311*b*, 9321*b*, 9331*b*, and 9401*b* disposed in the first insulating layer 960*a*.

The second insulating layer 960*b* may include a front conductive strip 9402*b*, a fourth side conductive strip 9312*a*, a fifth side conductive strip 9322*a*, and a sixth conductive strip 9332*a*. The front conductive strip 9402*b* may be disposed at one edge of the second insulating layer 960*b* and may also be disposed in an area corresponding to the edge at which the first notch portion 911 is disposed in the first conductive plate 910. The front conductive strip 9402*b* may include front conductive via holes 9402*a* into which front conductive vias may be inserted. A first conductive structure 611 of the first antenna structure may be constituted with (e.g., physically or electrically connected with) the conductive strip 9402*b* and vias inserted into the front conductive via holes 9402*a*.

When viewed from above the second insulating layer 960*b*, the first side conductive strip 9212*a* may be disposed to be substantially parallel to the third side conductive strip 9232*a* and to be spaced apart from the third side conductive strip 9232*a*. When viewed from above the second insulating layer 960*b*, the fourth side conductive strip 9312*a* may be disposed to be substantially parallel to the fifth side conductive strip 9332*a* and to be spaced apart from the fifth side conductive strip 9332*a*. When viewed from above the second insulating layer 960*b*, the second side conductive strip 9322*a* may be disposed to be substantially parallel to the sixth side conductive strip 9322*a* and to be spaced apart from the sixth side conductive strip 9322*a*.

The second side conductive strip 9222*a* may connect an end connected to the first side conductive strip 9212*a* and an end connected to the third side conductive strip 9232*a* to each other. The sixth side conductive strip 9332*a* may connect an end connected to the fourth side conductive strip 9312*a* and an end connected to the fifth side conductive strip 9332*a* to each other. The fourth side conductive strip 9212*a*, the fifth side conductive strip 9222*a*, and the sixth side conductive strip 9232*a* may be inserted into the fourth side via holes 9312*b*, the fifth side via holes 9322*b*, and the sixth side via holes 9332*b*, respectively, so as to configure a fourth conductive structure 830. A plurality of vias are inserted into the fourth side via holes 9312*b*, the fifth side via holes 9322*b*, and the sixth side via holes 9332*b* so as to be electrically connected to the fourth side conductive strip 9212*a*, the fifth side conductive strip 9222*a*, and the sixth side conductive strip 9232*a*.

The second insulating layer 960*b* may include a conductive via 9132*a* for power supply.

Referring to FIG. 9D, a third insulating layer 960*c* disposed under a plurality of second insulating layers 960*b* is illustrated. The third insulating layer 960*c* may be a layer adjacent to the second insulating layers 960*b*, and third insulating layers 960*c* having the same shape may be configured as a plurality of layers. The third insulating layer 960*c* may be a layer adjacent to the second conductive layer 990.

The third insulating layer 930*c* may include a plurality of conductive strips 9213*a*, 9223*a*, 9233*a*, 9313*a*, 9323*a*, 9134, and 9403*a*, and a plurality of via holes 9213*b*, 9223*b*, 9233*b*, 9313*b*, 9323*b*, 9133*a*, 9133*b*, and 9403*a*. A first side conductive strip 9213*a*, a second side conductive strip 9223*a*, and a third side conductive strip 9233*a*, which correspond to a part of a third conductive structure 820, may be patterned on the third insulating layer 960*c*. The first side conductive strip 9213*a*, the second side conductive strip 9223*a*, and the third side conductive strip 9233*a* may be configured to be substantially the same as the strips provided in the first insulating layer 960*a*.

The first side conductive strip 9213*a* may include first side via holes 9213*b*. The second side conductive strip 9223*a* may include second side via holes 9223*b*. The third side conductive strip 9233*a* may include third side via holes 9233*b*. The first side via holes 9213*b*, the second side via holes 9223*b*, and/or the third side via holes 9233*b* may also be disposed in the third insulating layer 960c. When viewed from above the third insulating layer 960c, the first side via holes 9213b, the second side via holes 9223b, or the third side via holes 9233b may at least partially overlap the plurality of via holes 9211b, 9221b, 9231b, 9311b, 9321b, 9331b, and 9401b disposed in the first insulating layer 960a.

When viewed from above the third insulating layer 960c, the front conductive strip 9403b and the front conductive via hole 9403a may at least partially overlap conductive strips and via holes disposed in the second insulating layer 960b.

Figure 10A:
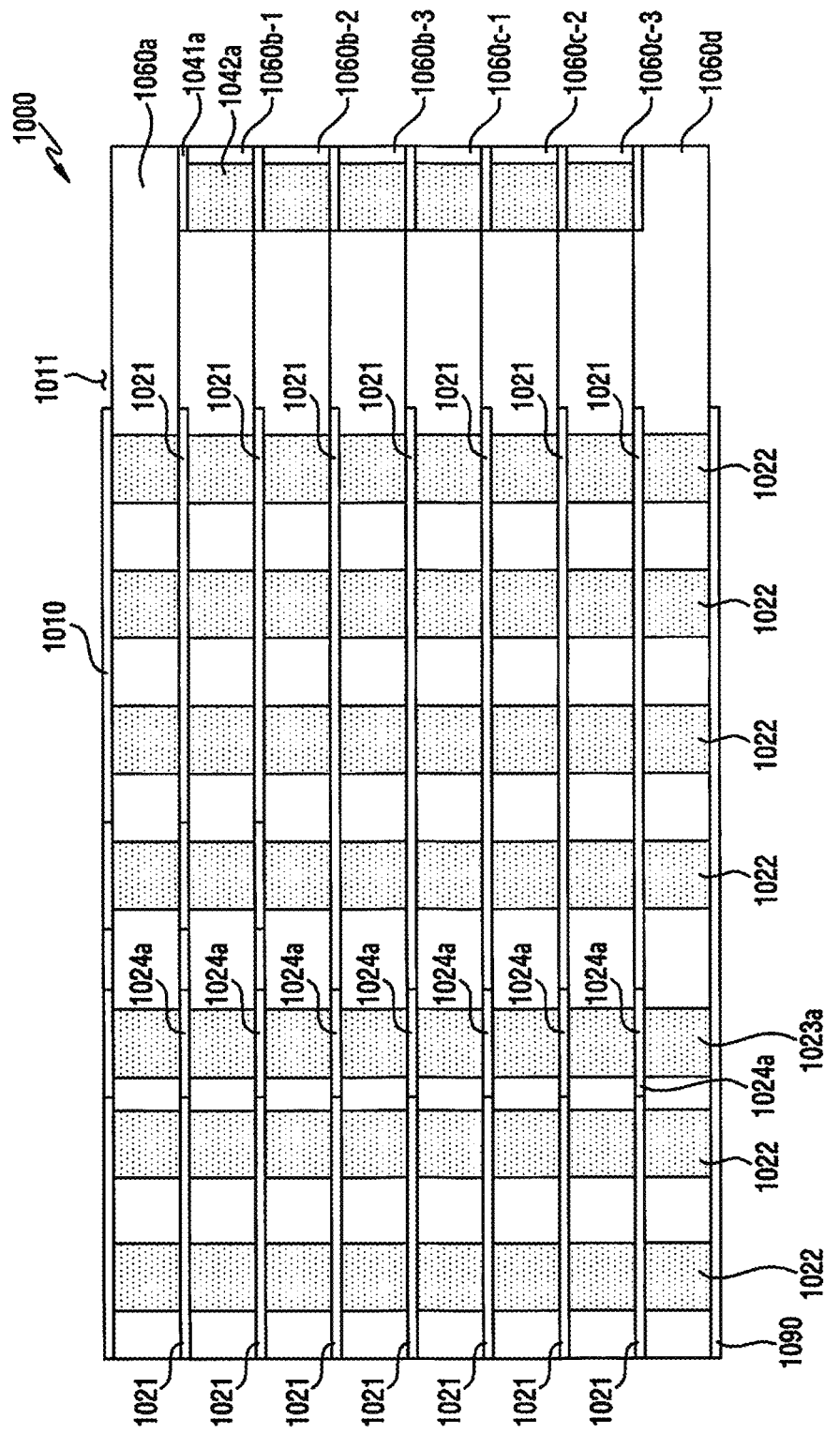
FIG. 10A is a cross-sectional view taken along line A-A' of FIG. 8B, according to an embodiment.
Figure 10B:
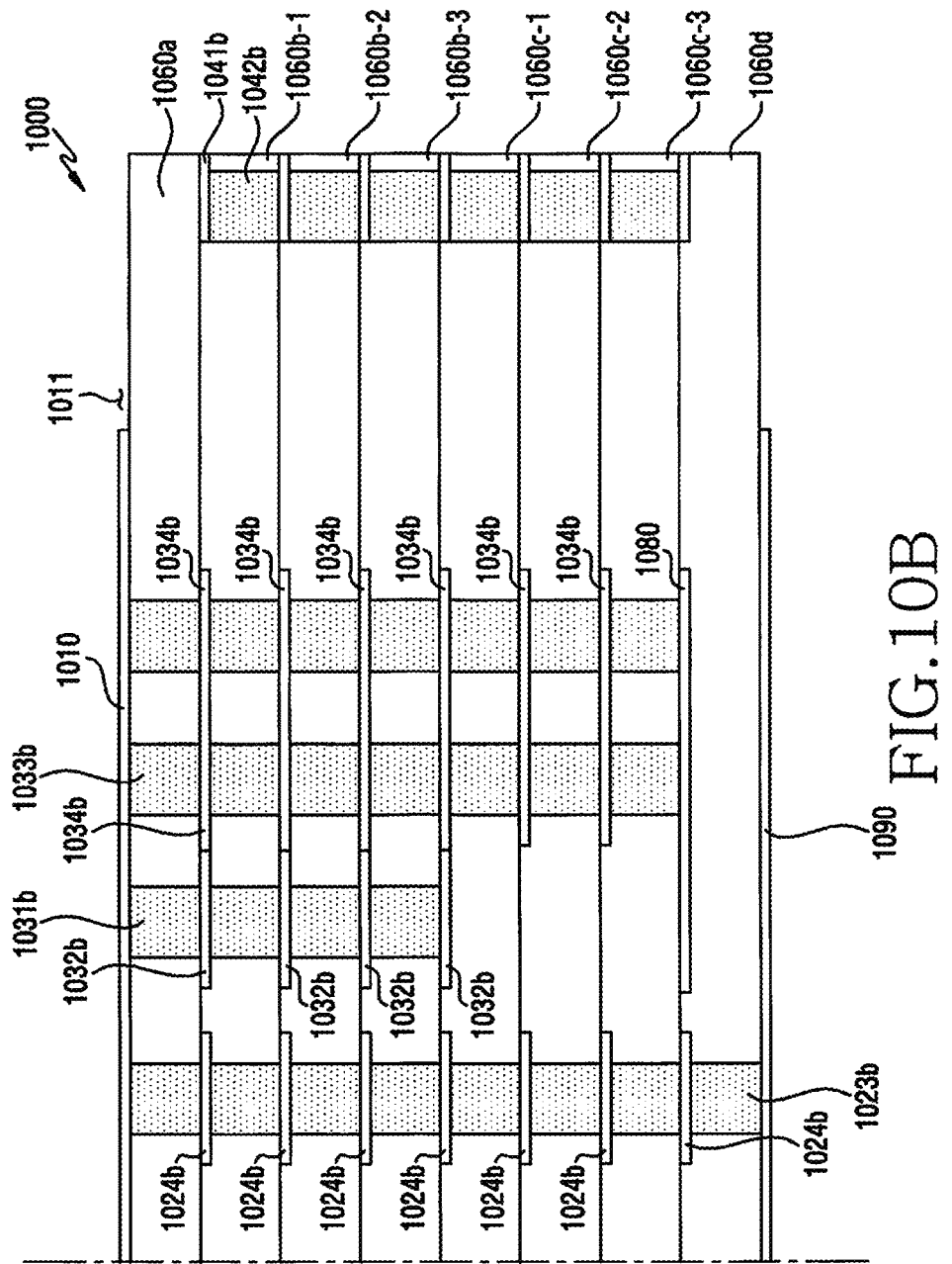
FIG. 10B is a cross-sectional view taken along line B-B' of FIG. 8B according to an embodiment.
Figure 10C:
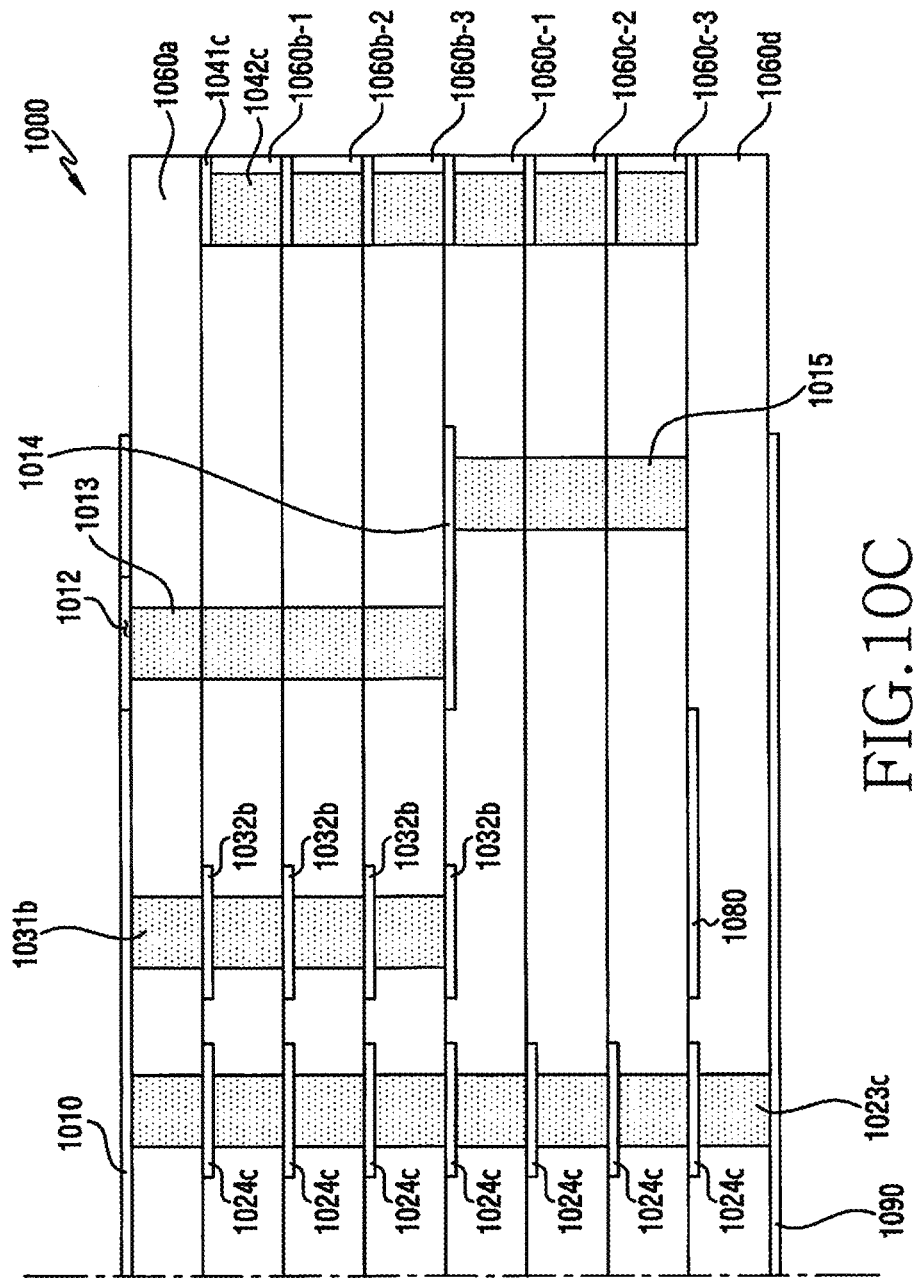
FIG. 10C is a cross-sectional view taken along line C-C' of FIG. 8B, according to an embodiment.
Figure 10D:
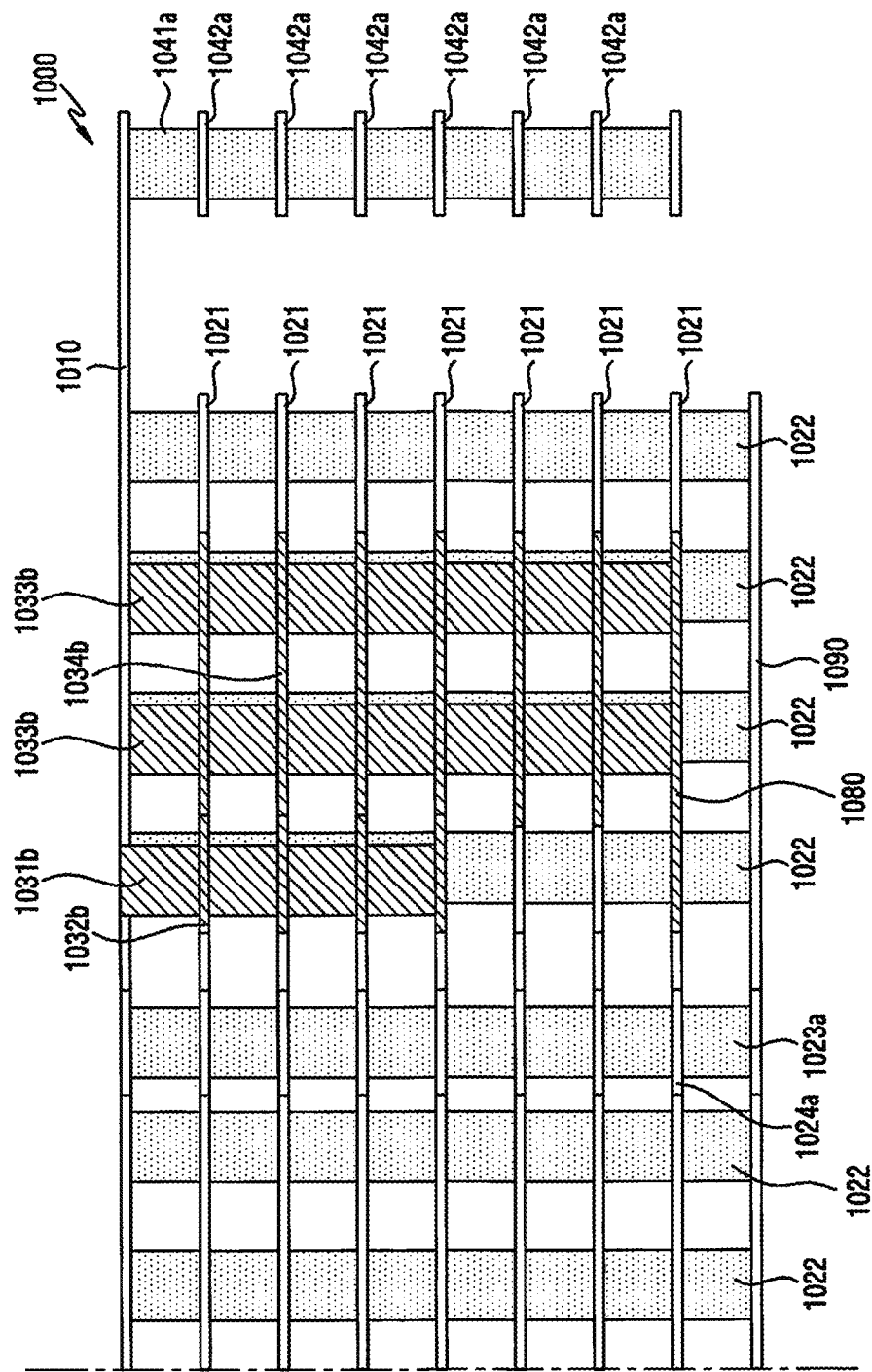
FIG. 10D is a view in which the cross-sectional views of FIGS. 10A and 10B are overlapped, according to an embodiment.

FIG. 10A is a cross-sectional view taken along line A-A' of FIG. 8B, according to an embodiment; FIG. 10B is a cross-sectional view taken along line B-B' of FIG. 8B, according to an embodiment; FIG. 10C is a cross-sectional view taken along line C-C' of FIG. 8B, according to an embodiment; and FIG. 10D is a view in which the cross-sectional views of FIGS. 10A and 10B, are overlapped, according to an embodiment.

Referring to FIG. 10A, a first antenna structure 1000 includes a plurality of insulating layers 1060a, 1060b-1, 1060b-2, 1060b-3, 1060c-1, 1060c-2, 1060c-3, and 1060d and a plurality of conductive vias 1022 and 1023a configuring a third conductive structure 820.

The plurality of insulating layers may include a first insulating layer 1060a, a plurality of second insulating layers 1060b-1, 1060b-2, and 1060b-3, a plurality of third insulating layers 1060c-1, 1060c-2, 1060c-3, and a fourth insulating layer 1060d.

A first conductive layer 1010 may be disposed on the first insulating layer 1060a. The first conductive layer 1010 may include a first notch portion 1011 that may be implemented as a slot. A second conductive layer 1090 may be formed on the fourth insulating layer 1060d. The first conductive layer 1010 and the second conductive layer 1090 may be electrically connected to each other by a plurality of conductive vias 1022 and 1023a. In the insulating layer into which the conductive vias 1022 and 1023a are inserted, first side conductive strips 1021 of the third conductive structure corresponding to the conductive vias 1022 and 1023a may be disposed. Each first side conductive strip 1021 of the third conductive structure may include an area 1024a that is in contact with a third side conductive strip 822a. The first side conductive via 1023a disposed in the contact area 1024a disposed in each first side conductive strip 1021 partially overlaps a third side conductive via 822b.

A front conductive via 1042a and a front conductive strip 1041a may be included. The front conductive via 1042a and the front conductive strip 1041a may configure a first conductive wall 611. The front conductive strip 1041a may not be disposed in the first insulating layer 1060a, and the corresponding portion may configure a slot of a first antenna structure 600 together with the first notch portion 1011.

Referring to FIG. 10B, the first antenna structure 1000 include a plurality of insulating layers 1060a, 1060b-1, 1060b-2, 1060b-3, 1060c-1, 1060c-2, 1060c-3, and 1060d, rear conductive vias 1023b configuring a second side surface 822 of the third conductive structure 820, and a plurality of conductive vias 1031b and 1033b configuring the fourth conductive structure 830.

A first conductive layer 1010 may be disposed on the top surface of the first insulating layer 1060a, and the first conductive layer 1010 may include a first notch portion 1011. A second conductive layer 1090 may be disposed on one surface of the fourth insulating layer 1060d. The first conductive layer 1010 and the second conductive layer 1090 may be electrically connected to each other via the rear conductive vias 1023b.

On each of the insulating layers 1060a, 1060b-1, 1060b-2, 1060b-3, 1060c-1, 1060c-2, 1060c-3, and 1060d, and on each of which a rear conductive via 1023b of the third conductive structure 820 is disposed, a second side conductive strip 1024 of the third conductive structure may be disposed. The rear conductive strips 1024b of the third conductive structure may be electrically connected to the rear conductive vias 1023b so as to configure the rear surface of the third conductive structure (e.g., the second conductive side wall 632).

The first antenna structure 1000 may include sixth side conductive vias 1031b and fourth side conductive vias 1031b of the fourth conductive structure 830, and may include a sixth side conductive strip 1032b and a fourth conductive strip 1034b of the fourth conductive structure in the area in which the sixth side conductive vias 1031b and the fourth side conductive vias 1033b of the fourth conductive structure are disposed.

The sixth side conductive vias 1031b and the fourth side conductive vias 1033b of the fourth conductive structure may be electrically connected to the first conductive layer 1010 and may be spaced apart from the second conductive layer 1090.

The fourth side conductive vias 1031b of the fourth conductive structure may be disposed in the first insulating layer 1060a and the plurality of second insulating layers 1060b-1, 1060b-2, and 1060b-3, and the fourth side conductive vias 1033b of the fourth conductive structure may be disposed in the first insulating layer 1060a, the plurality of second insulating layers 1060b-1, 1060b-2, and 1060b-3, and the plurality of third insulating layers 1060c-1, 1060c-2, and 1060c-3. The plurality of third insulating layers 1060c-1, 1060c-2, and 1060c-3 do not have the second side conductive vias 1031b disposed therein, and have an aperture 643 through which an electric field can be transmitted to the third conductive structure.

Referring to FIG. 10C, the first antenna structure 1000 include a plurality of insulating layers 1060a, 1060b-1, 1060b-2, 1060b-3, 1060c-1, 1060c-2, 1060c-3, and 1060d, second side conductive vias 1023c configuring the second side surface 822 of the third conductive structure 820, sixth conductive vias 1031b configuring the fourth side surface 831 of the fourth conductive structure, and a first conductive via 1013 and a second conductive via 1015 for power supply.

The plurality of insulating layers 1060a, 1060b-1, 1060b-2, 1060b-3, 1060c-1, 1060c-2, 1060c-3, and 1060d, the second side conductive vias 1023c configuring the second side surface of the third conductive structure, and the sixth side conductive vias 1031b configuring the fourth side surface 831 of the fourth conductive structure 830 may be substantially identical or similar to those of FIG. 10B, and a description thereof will be omitted.

The first conductive layer 1010 may include an opening 1012 for power supply, and may supply power via the first conductive via 1013 for power supply. The opening 1012 provided in the first conductive plate 1010 may have a diameter larger than the diameter of the first conductive via 1013. When viewed from above the first conductive layer 1010, the second conductive via 1015 may be disposed to be spaced apart from the first conductive via 1013, and may be electrically connected to the first conductive via 1013 via an additional conductive strip 1014 in the layer in which the first conductive via 1013 and the second conductive via 1015 are spaced apart from each other. The layer on which the additional conductive strip 1014 is disposed is not limited to the third insulating layer 1060c-1, and may be disposed at various positions depending on the performance or structure of the antenna. The end of the second conductive via 1015 may be disposed at various positions among the boundaries of the insulating layers, and the second conductive via 1015 may be electrically connected to a communication circuit 530 connected to a board 510 on which the first antenna module 1000 is disposed. Also, the additional conductive strip 1014 may be omitted, and the first conductive via 1013 and the second conductive via 1015 may be integrally configured.

Referring to FIG. 10D, the surface (e.g., the third conductive side wall 633) constituted with the first side conductive vias 1022 of the third conductive structure 820 may be configured to be wider than the surface (e.g., the sixth side wall 636) constituted with the fourth side conductive vias 1033 of the fourth conductive structure 830. The second side conductive vias 1023 of the third conductive structure may be located further away from the front conductive vias 1041 than the sixth side conductive vias 1031 of the fourth conductive structure. The third conductive structure may be constituted with the conductive strips 1024, the first side conductive vias 1022, and the second side conductive vias 1023 of the third conductive structure. The fourth conductive structure may be constituted with the sixth side conductive strips 1032b, the sixth side conductive vias 1031, the side conductive strips 1034b, and the side conductive vias 1033b of the fourth conductive structure.

The distance between the front conductive vias 1041a and the sixth side conductive vias 1031b of the fourth conductive structure may be determined based on the second frequency band implemented in the first antenna structure 1000, and the distance between the front conductive vias 1041a and the second conductive vias 1023a of the third conductive structure may be determined based on the first frequency band lower than the second frequency band implemented in the first antenna structure 1000.

Figure 11:
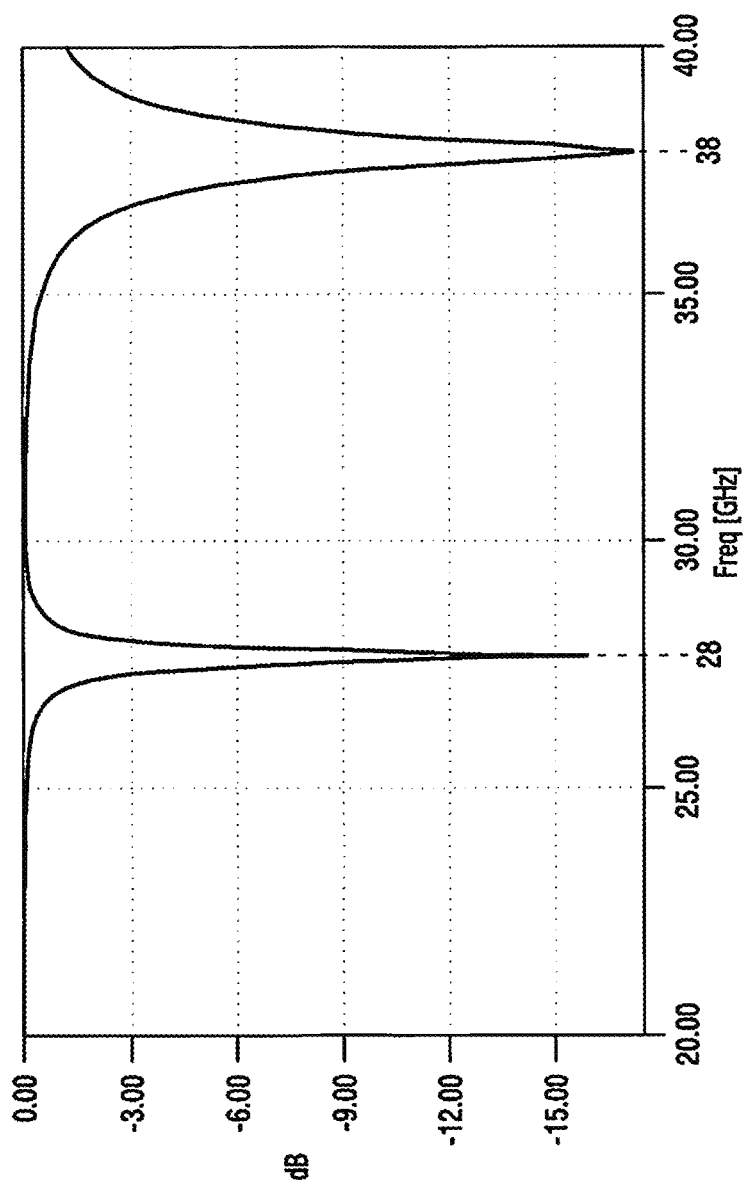
FIG. 11 is a graph showing S-parameters of an antenna module, according to an embodiment.

FIG. 11 is a graph showing S-parameters of the first antenna structure of FIG. 8A, according to an embodiment.

Referring to FIG. 11, the first antenna structure 800 may generate double resonance in a 28 GHz band and a 38 GHz band. Through the first antenna structure 800, a reflection loss of −15 decibels (dB) or less occurs at 28 GHz and 38 GHz, and the first antenna structure 800 may be implemented as an antenna having dual-band characteristics. The 28 GHz band may be affected by the third conductive structure 820 of the first antenna structure, and the 38 GHz band may be affected by the fourth conductive structure 830 of the first antenna structure. The low-frequency band (28 GHz) and high-frequency band (38 GHz) characteristics of the first antenna structure 800 may be tuned by adjusting the length or width of the third conductive structure 820 or the fourth conductive structure 830.

Figure 12B:
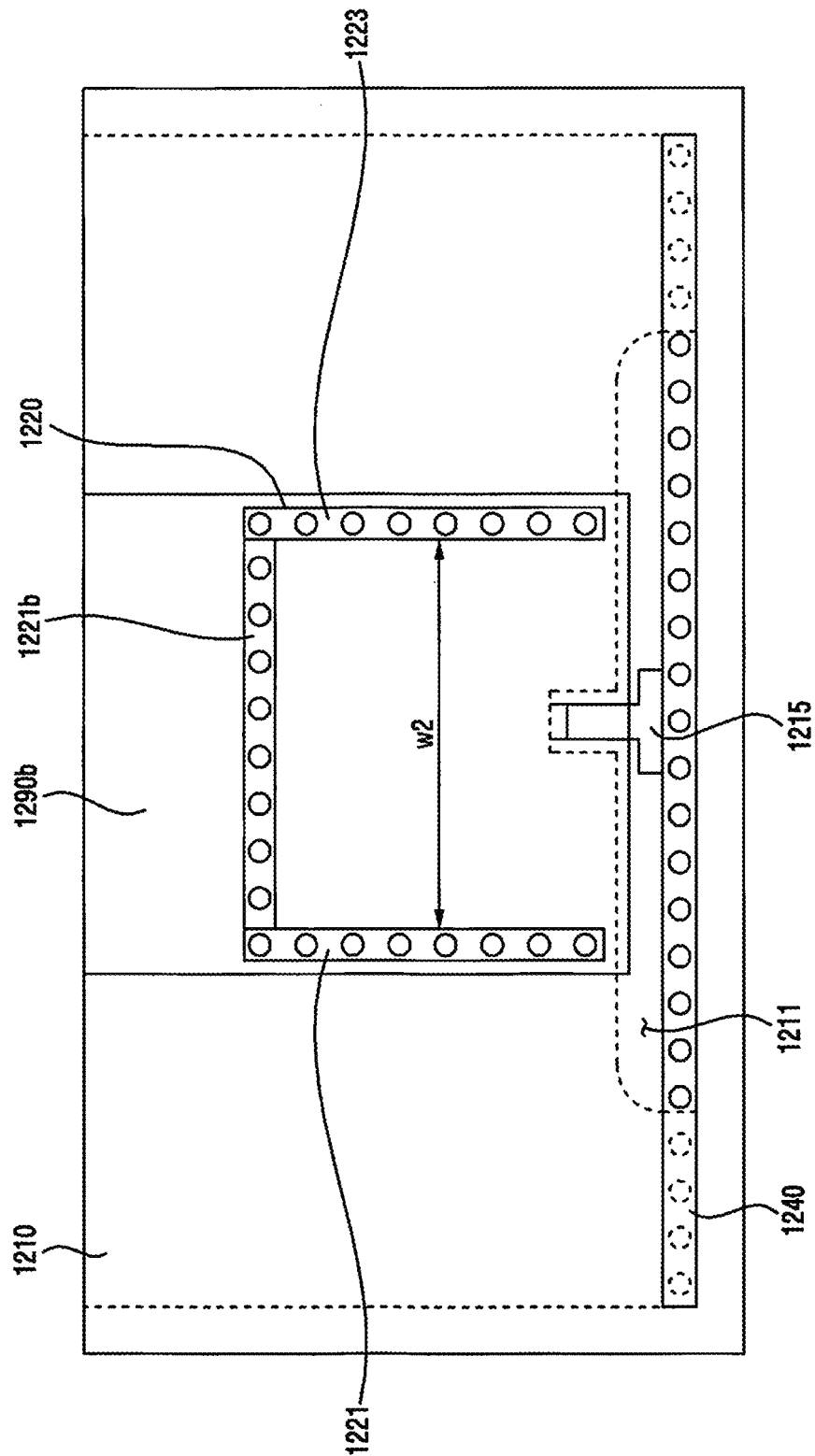
FIG. 12B is a plan view illustrating an antenna module according to a width of a cavity, according to an embodiment.
Figure 12C:
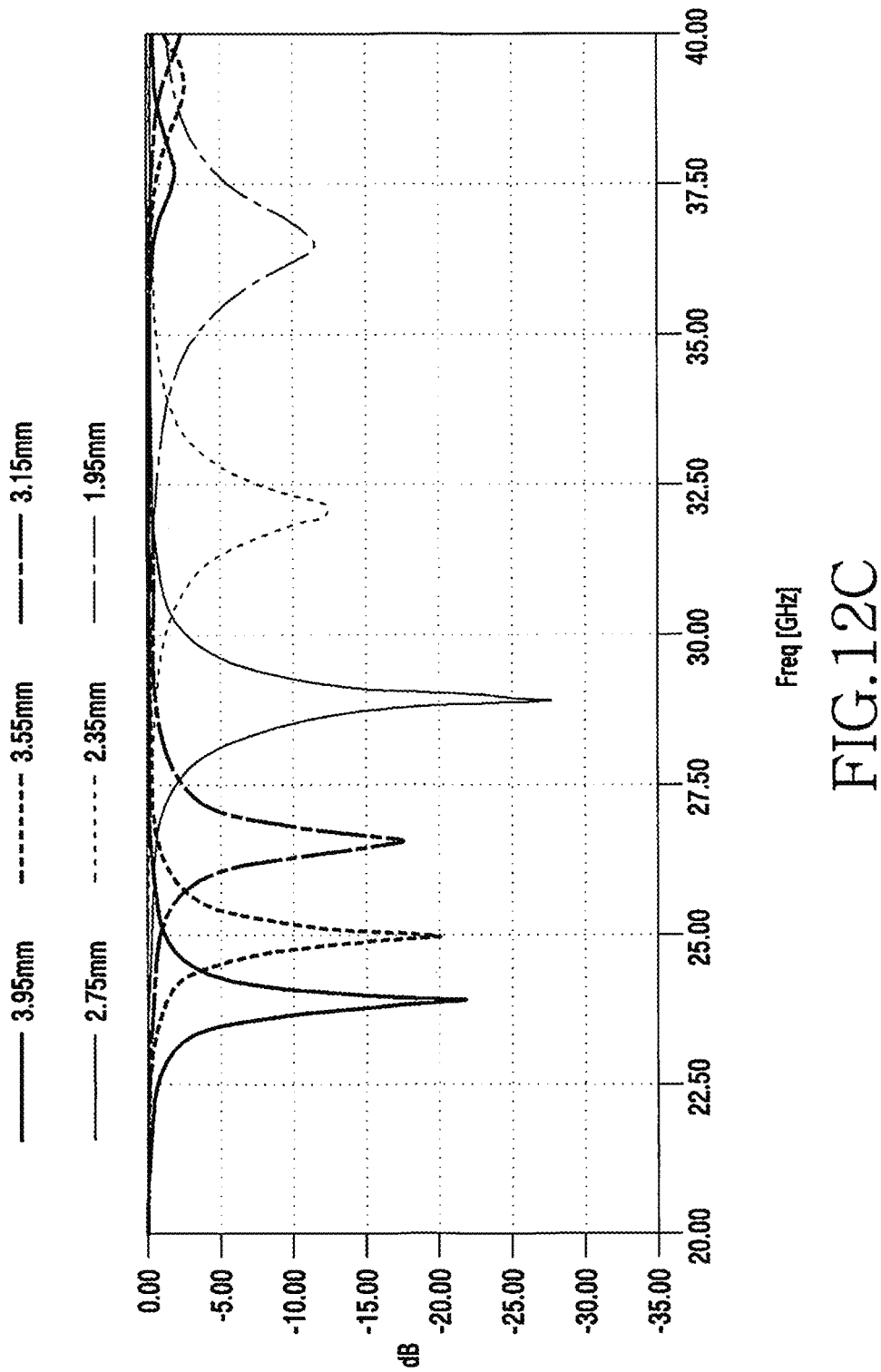
FIG. 12C is a graph showing S-parameters of an antenna module according to the widths of various cavities, according to an embodiment.

FIGS. 12A and 12B are plan views, each illustrating an antenna module according to a width of a cavity, according to various embodiments. FIG. 12C is a graph showing S-parameters of an antenna module according to the widths of various cavities, according to an embodiment.

Referring to FIGS. 12A and 12B, a first antenna structure 1200 includes a first conductive structure 1240, a second conductive structure 1215, or a third conductive structure 1220. A first conductive layer 1210 includes a first notch portion 1211. A second conductive structure 1215 may be disposed inside the first notch portion 1211.

The third conductive structure 1220 includes a first side conductive strip 1222, a second side conductive strip 1223, and a third conductive strip 1221a. The widths w1 and w2 between the first side conductive strip 1222 and the second side conductive strip 1223 may be adjusted. The length w1 of the third side conductive strip 1221a in FIG. 12A may be longer than the length w2 of the third side conductive strip 1221b in FIG. 12B.

Referring to FIG. 12C, it can be seen that the frequency band exhibiting the characteristic of a reflection loss according to the width of the cavity 1220 changes. As the width between the first side surface 1222 and the second side surface 1223 decreases, a frequency at which resonance is generated may increase.

Figure 13A:
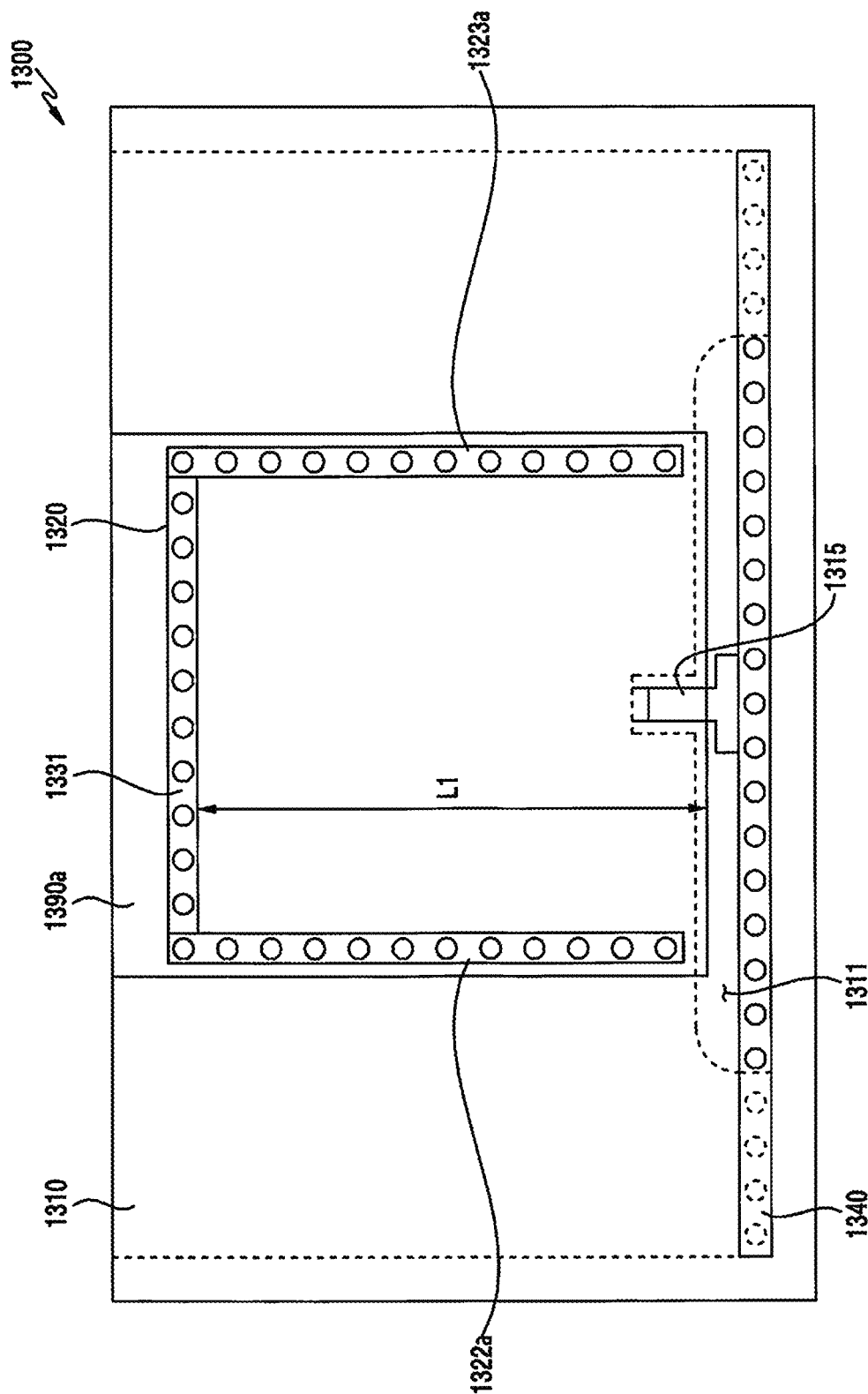
FIG. 13A is a plan view illustrating an antenna module according to a length of a cavity, according to an embodiment.
Figure 13C:
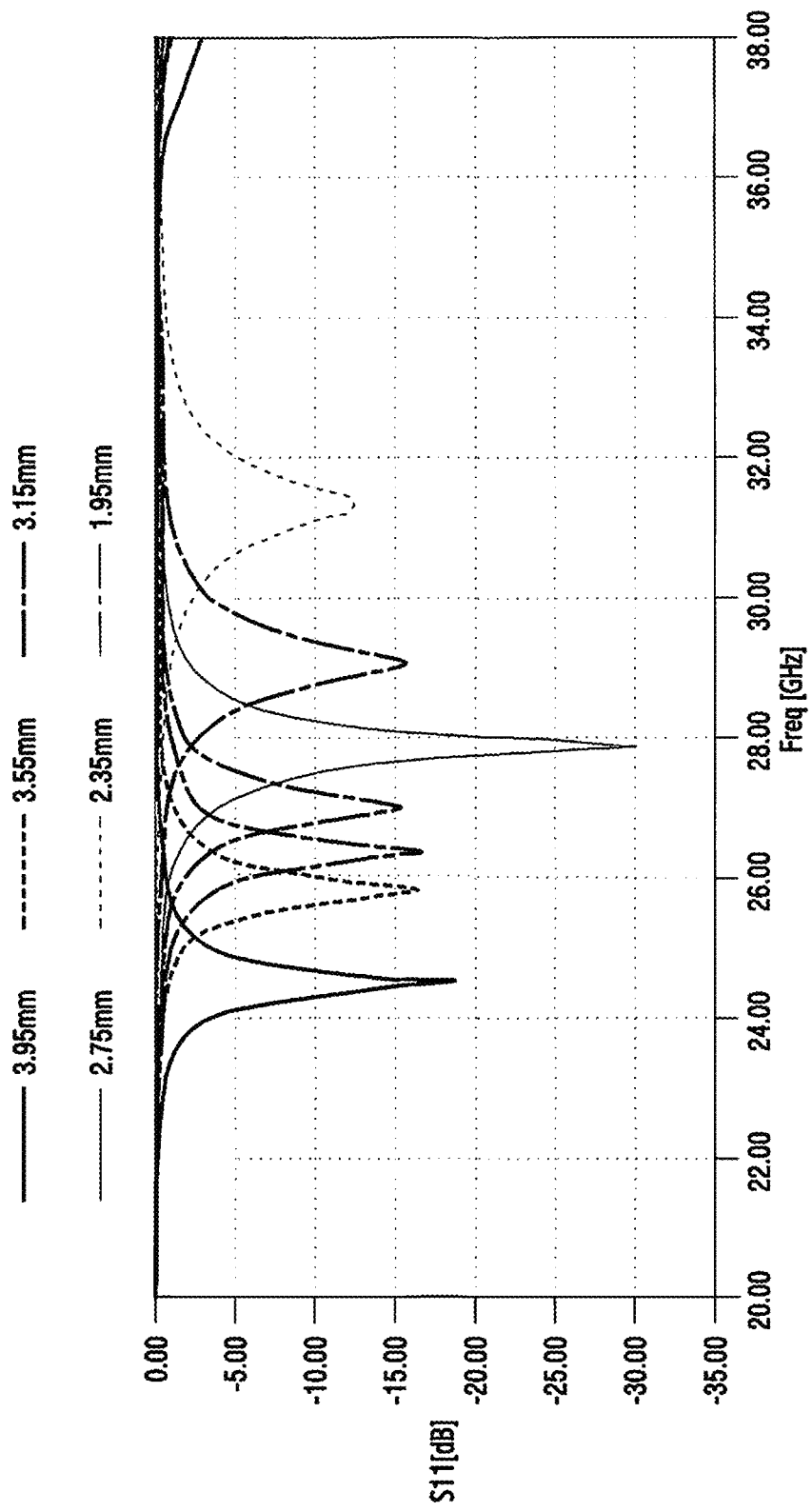
FIG. 13C is a graph showing S-parameters of an antenna module according to the lengths of various cavities, according to an embodiment.

FIGS. 13A and 13B are plan views, each illustrating an antenna module according to a length of a cavity, according to various embodiments, and FIG. 13C is a graph showing S-parameters of an antenna module according to the lengths of various cavities, according to an embodiment.

Referring to FIGS. 13A and 13B, a first antenna structure 1300 includes a first conductive structure 1340, a second conductive structure 1315, or a third conductive structure 1320. A first conductive layer 1310 includes a first notch portion 1311. A second conductive structure 1315 may be disposed inside the first notch portion 1311.

The third conductive structure 1320 includes a first side conductive strip 1322a, a second side conductive strip 1323a, and a third side conductive strip 1331. The distance L1 between the third side conductive strip 1331 and the edge facing the slot 1311 of the second conductive layer 1390a may be adjusted. The distance L1 may be the length of the first side conductive strip 1322a or the second side conductive strip 1323a. The length L1 of the first side conductive strip 1322a in FIG. 13A or the second side conductive strip 1323a in FIG. 13A may be longer than the length L2 of the first side conductive strip 1322b in FIG. 13B or the second side conductive strip 1323b in FIG. 13B.

In the third conductive structure 1320, according to a change in the length of the first side conductive strip 1322a and the second conductive strip 1323a and a change in the length of the third conductive strip 1331, the areas of the second conductive layer 1390a in FIG. 13A and the second conductive layer 1390b in FIG. 13B may also be different from each other.

Figure 14A:
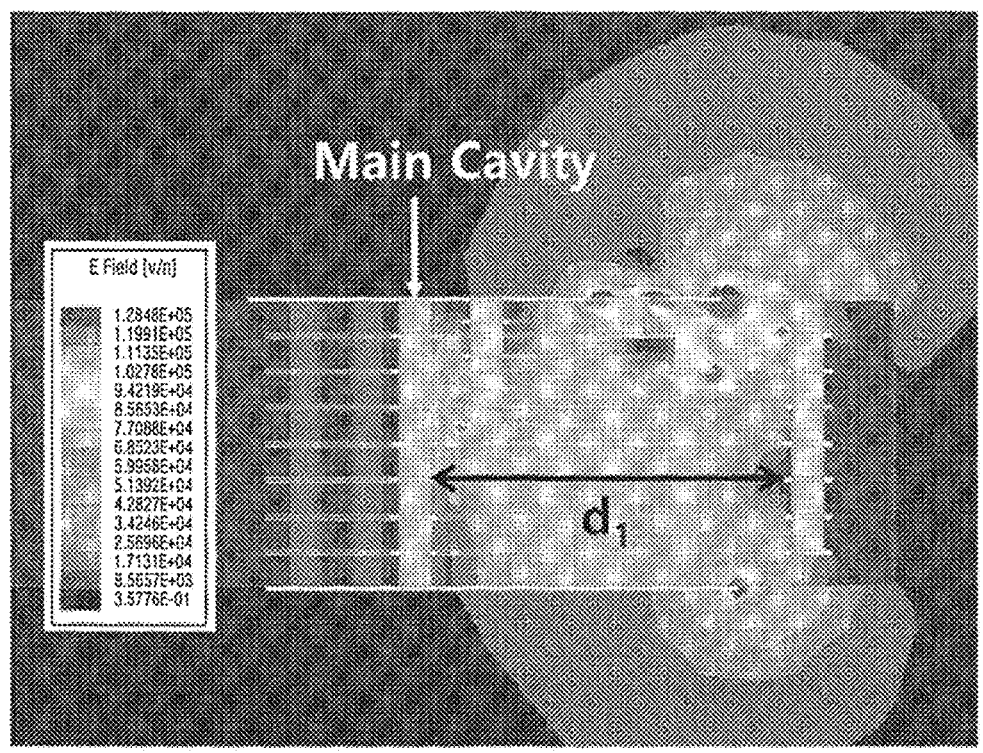
FIG. 14A is a view illustrating the intensities of electric fields generated by an antenna module in a specific frequency band, according to an embodiment.
Figure 14B:
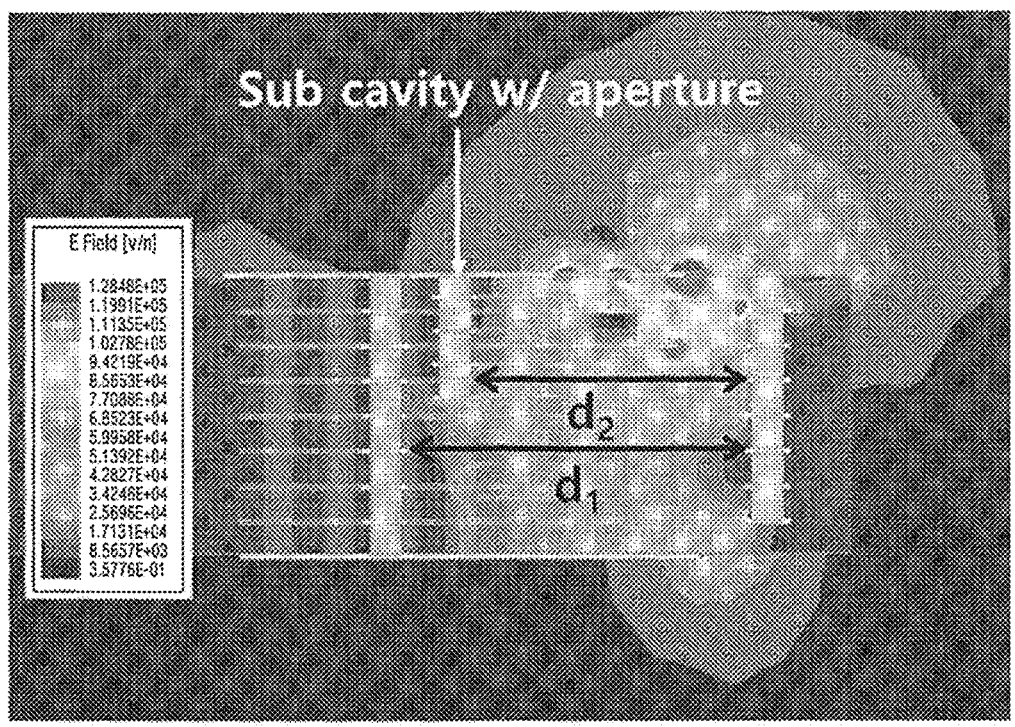
FIG. 14B is a view illustrating the intensities of electric fields generated by an antenna module in a specific frequency band, according to an embodiment.

FIGS. 14A and 14B are views illustrating the intensities of electric fields generated by an antenna module in a specific frequency band, according to various embodiments.

Referring to FIG. 14A, the intensities of magnetic fields when a resonance of 28 GHz is generated in an antenna structure are represented. It can be seen that there is a section in which the intensities of the electric fields increase inside the cavity having the distance d1 between the third conductive structure 830 and the first conductive structure (e.g., the first conductive wall 840). A resonance mode of 28 GHz may be generated through resonance of the cavity defined by the third conductive structure.

Referring to FIG. 14B, the intensities of magnetic fields when a resonance of 38 GHz is generated in an antenna structure are represented. It can be seen that there is a section in which the intensities of the electric fields increase inside the cavity having the distance d2 between the fourth conductive structure 830 and the first conductive wall 840. A resonance mode of 38 GHz may be generated through resonance of the cavity generated by the fourth conductive structure.

Figure 15A:
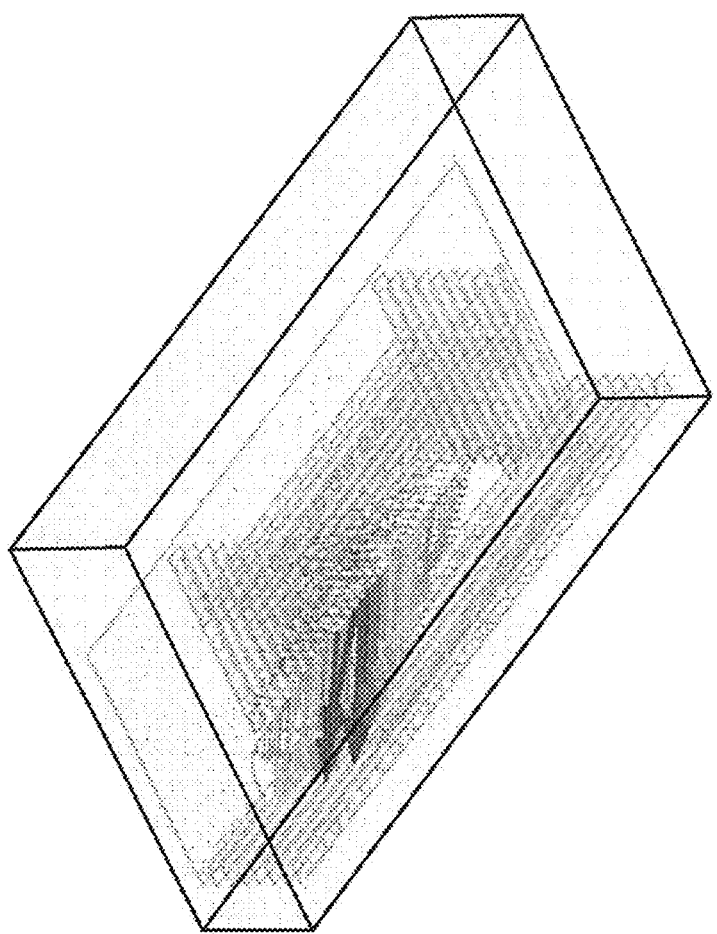
FIG. 15A is a view in which the intensities of electric fields generated in a specific frequency band are represented by vectors in an antenna module, according to an embodiment.
Figure 15A:
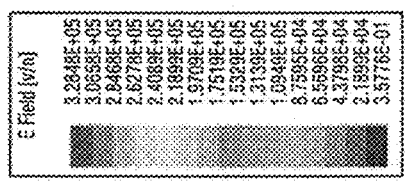

FIGS. 15A and 15B are views in which the intensities of electric fields generated in a specific frequency band are represented by vectors in an antenna module, according to various embodiments.

Referring to FIGS. 15A and 15B, the intensities of electric fields passing through the slot in the antenna structure 600 are represented by vectors. It can be seen through the directions and magnitudes of the vectors that strong electric fields are generated in the vertical direction through the radiating part of the antenna. When the electric fields excited in the slot are transmitted to the third conductive structure and the fourth conductive structure, the electric fields may be reflected by the cavity defined by conductors and reflected to the area in which the slot is defined. It can be seen that a strong electric field distribution in which the intensity of a reflected electric field is 3*10^5 [volts (V)/meter (m)] is generated.

Referring to FIG. 15A, in the 28 GHz band, a strong vertical electric field distribution is generated through the radiating part of the slot antenna, and referring to FIG. 15B, in the 38 GHz band, a strong vertical electric field distribution is generated through the radiating part of the slot antenna. It can be seen that the electric fields proceed with vertical polarization in the antenna structure.

Figure 16A:
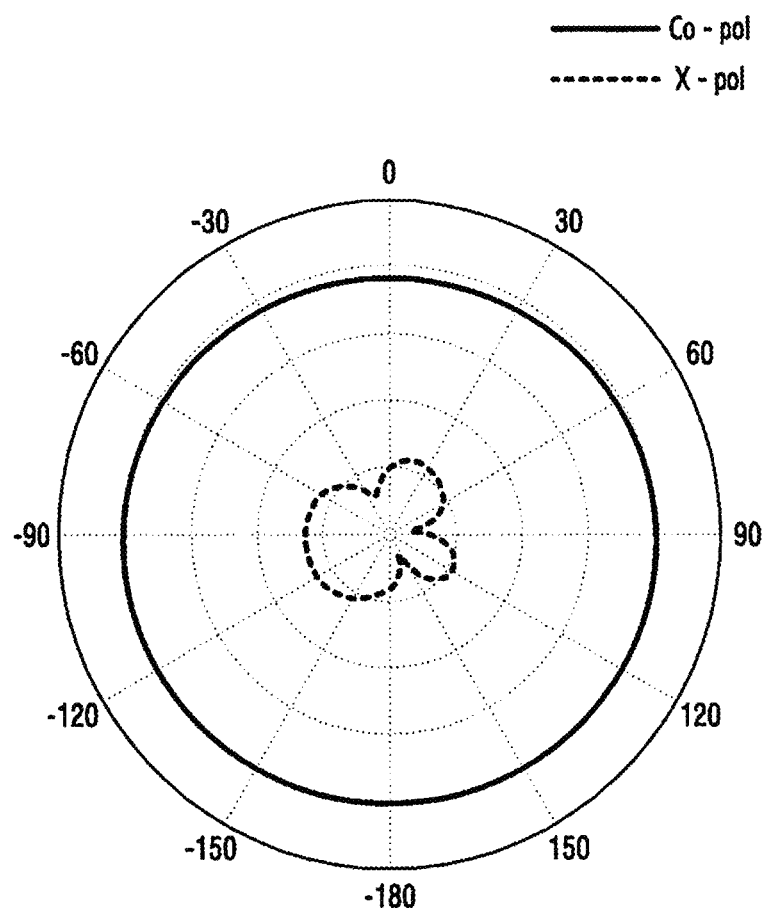
FIG. 16A is a view representing radiation patterns generated in a designated frequency band through an antenna module in a two-dimensional manner, according to an embodiment.
Figure 16B:
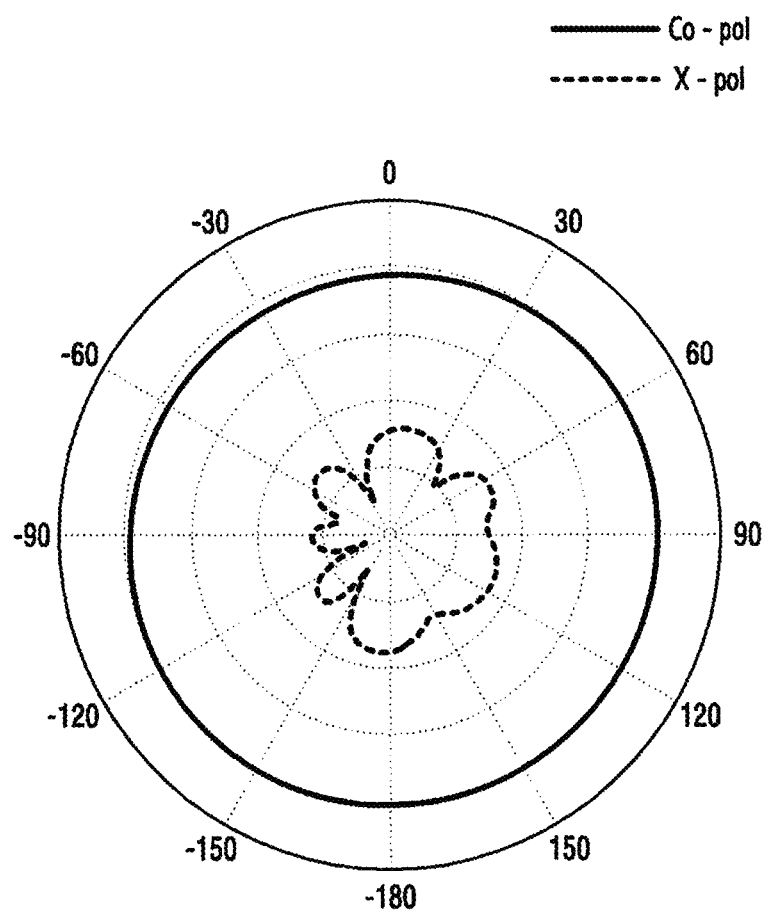
FIG. 16B is a view representing radiation patterns generated in a designated frequency band through an antenna module in a two-dimensional manner, according to an embodiment.

FIGS. 16A and 16B represent radiation patterns generated in a designated frequency band through an antenna module in a two-dimensional manner, according to various embodiments.

Referring to FIG. 16A, in the 28 GHz band, it can be seen that in the radiation pattern emitted from an antenna structure 600, there is a difference of 20 dB or more in the intensities of electric fields between a signal gain of the same polarization and a signal gain of the cross polarization, and that the antenna structure shows a characteristic in which the cross polarization is low in the corresponding frequency band, and thus has a radiation pattern in a desired direction.

Referring to FIG. 16B, in the 38 GHz band, it can be seen that in the radiation pattern emitted from an antenna structure according to an embodiment, there is a difference of 20 dB or more in the intensities of electric fields between a signal gain of the same polarization and a signal gain of the cross polarization, and the antenna structure shows a characteristic in which the cross polarization is low in the corresponding frequency band, and thus has a radiation pattern in a desired direction.

Figure 17A:
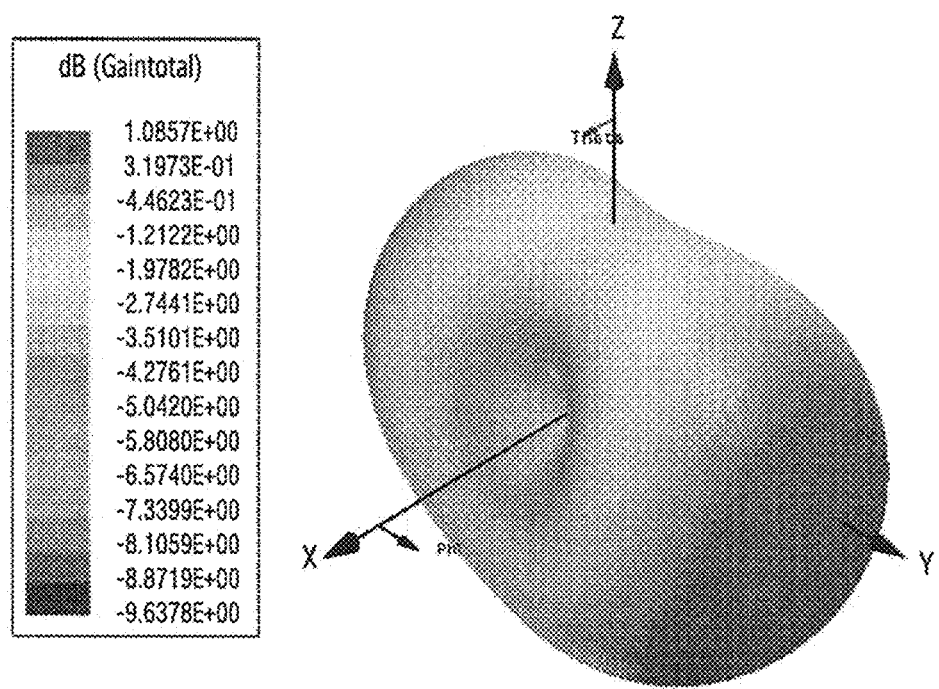
FIG. 17A is a view representing radiation patterns generated in a designated frequency band through an antenna module in a three-dimensional manner, according to an embodiment.
Figure 17B:
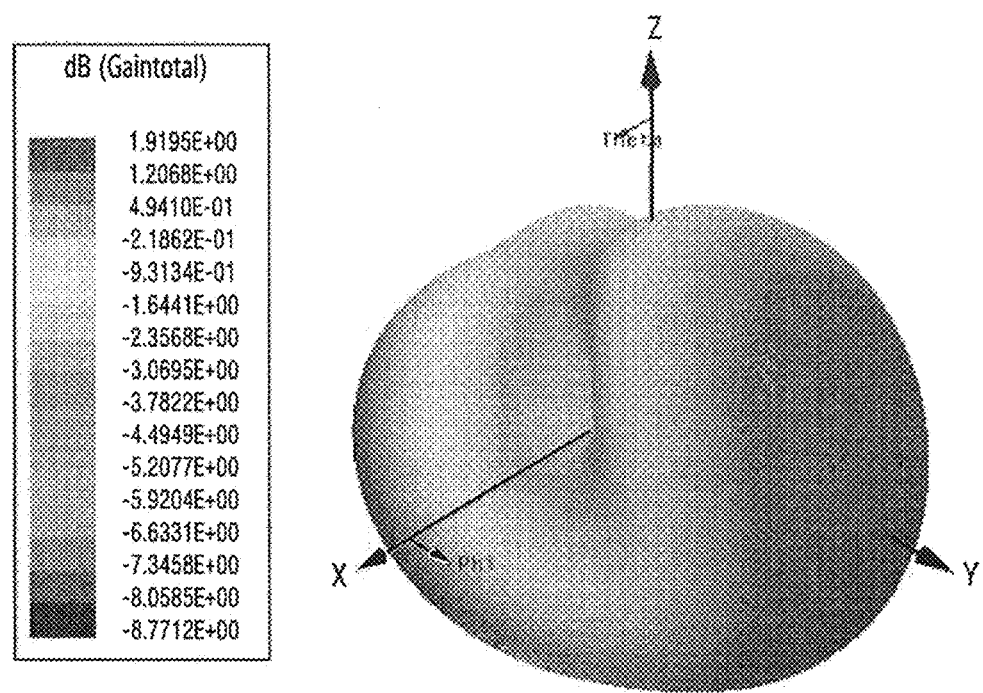
FIG. 17B is a view representing radiation patterns generated in a designated frequency band through an antenna module in a three-dimensional manner, according to an embodiment.

FIGS. 17A and 17B represent radiation patterns generated in a designated frequency band through an antenna module in a three-dimensional manner, according to various embodiments.

Referring to FIGS. 17A and 17B, it can be seen that there is a vertical polarization characteristic in a direction in which an antenna structure 600 is arranged, and the antenna structure may operate as an end fire antenna. Referring to FIG. 17A, in the 28 GHz band, it can be seen that maximum radiation occurs in the y-axis direction in the radiation pattern emitted from the antenna structure, and that radiation in the x-axis direction corresponding to the cross polarization hardly occurs.

Referring to FIG. 17B, in the 38 GHz band, it can be seen that maximum radiation occurs in the y-axis direction in the radiation pattern emitted from the antenna structure, and that radiation in the x-axis direction corresponding to the cross polarization hardly occurs. It can be seen that the antenna structure shows a characteristic in which the cross polarization is low in the corresponding frequency band, and thus has a radiation pattern in a desired direction.

Figure 18A:
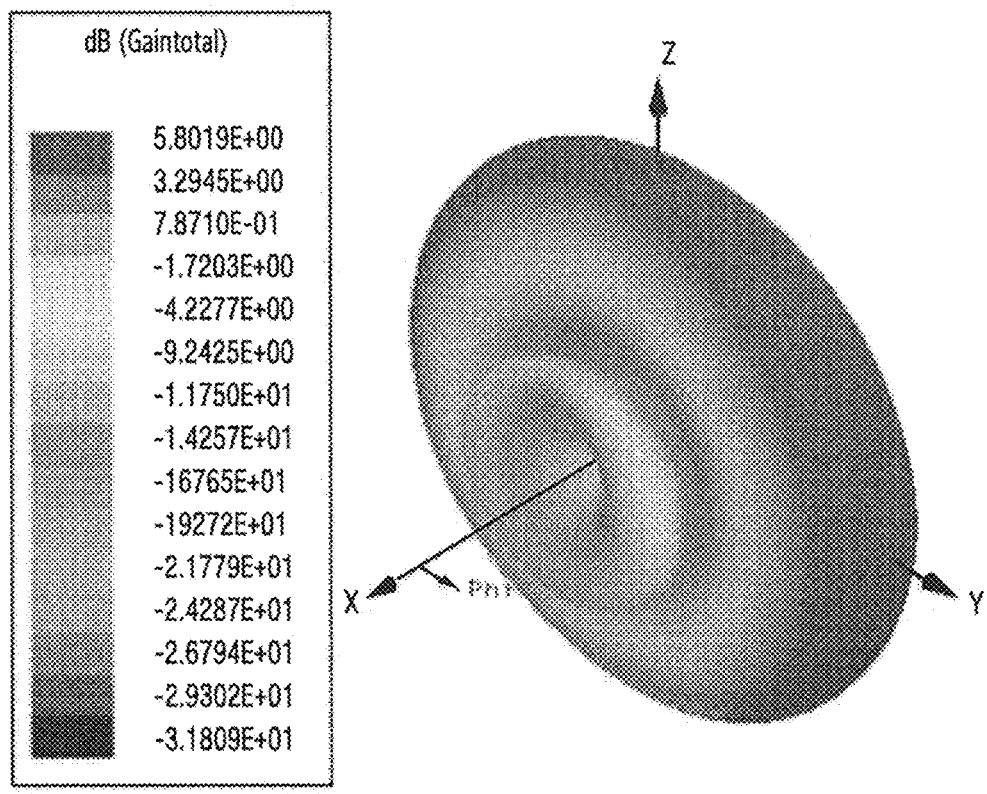
FIG. 18A is a view representing radiation patterns generated in a designated frequency band through an arranged antenna module in a three-dimensional manner, according to an embodiment.
Figure 18B:
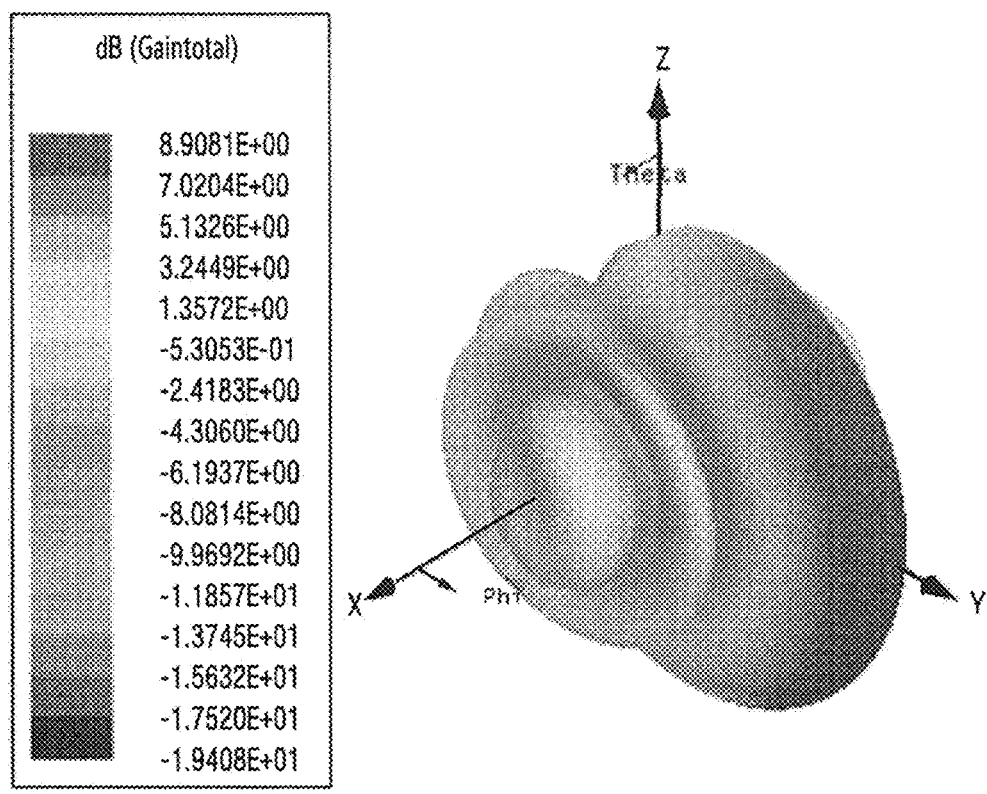
FIG. 18B is a view representing radiation patterns generated in a designated frequency band through an arranged antenna module in a three-dimensional manner, according to an embodiment.

FIGS. 18A and 18B represent radiation patterns generated in a designated frequency band through an arranged antenna module in a three-dimensional manner, according to various embodiments.

Referring to FIGS. 18A and 18B, radiation patterns through the antenna module 700 including four antenna structures can be seen. Referring to FIG. 18A, in the band of 28 GHz, it can be seen that the radiation pattern radiated from a communication device has a signal gain characteristic of 5.8 dB, and referring to FIG. 18B, in the band of 38 GHz, it can be seen that the radiation pattern radiated from a communication device has a signal gain characteristic of 9.29 dB.

An electronic device 300 may include a housing 310 including a first plate 310A that is directed outward in a first direction, a second plate that is directed outward in a second direction opposite to the first direction, and a side member that surrounds the space between the first and second plates; a first antenna structure located in the space and including a first conductive structure 601, wherein the first conductive structure includes a first conductive layer 610, which is substantially parallel to the second plate and includes a first edge 651 extending in a third direction perpendicular to the first direction and a first notch portion 615 disposed at the first edge, and a first conductive wall 611, which is substantially perpendicular to the first conductive layer and includes a second notch portion 616 extending from the first edge and connected to the first notch portion; a second conductive structure 620 located in the first notch portion and electrically isolated from the first conductive structure; a third conductive structure 630 located between the first conductive layer and the first plate and electrically isolated from the first conductive structure and the second conductive structure, wherein the third conductive structure 630 includes a quadrilateral second conductive layer 631 facing the first conductive layer and including a second edge 652 extending parallel to the first edge, a third 653 extending perpendicular to the second edge, a fourth edge 654 extending parallel to the third edge, and a fifth edge 655 extending parallel to the second edge, wherein a distance to the fifth edge from the first conductive wall is shorter than a distance to the second edge from the first conductive wall; a second conductive wall 632 facing the first conductive wall and extending from the second edge; a third conductive wall 633 connected to the third edge and the second conductive wall and perpendicular to the second conductive layer and the second conductive wall; and a fourth conductive wall 634 connected to the fourth edge and the second conductive wall and perpendicular to the second conductive layer and the second conductive wall; and a wireless communication circuit 530 electrically connected to the second conductive structure and configured to transmit and/or receive a signal having a frequency of 3 GHz to 100 GHz.

The first conductive layer may further include a third notch portion 617 further cut from the first notch portion, and the second conductive structure may include a conductive portion 621 protruding into the third notch portion.

The first antenna structure may further include a fourth conductive structure 640 located between the first conductive structure and the third conductive structure. The fourth conductive structure may include a third conductive layer 643 facing the first conductive layer and including a sixth edge 656 parallel to the first edge, a seventh edge 657 extending perpendicular to sixth edge, an eighth edge 658 extending parallel to the seventh edge, and a ninth edge 659 parallel to the sixth edge, wherein a distance to the ninth edge from the first conductive wall is shorter than a distance to the sixth edge from the first conductive wall; a fifth conductive wall 635 facing the first conductive side wall and separated from the third conductive layer; a sixth conductive wall 636 perpendicular to the third conductive layer and the fifth conductive wall and connected to the seventh edge and the fifth conductive wall; and a seventh conductive wall 637 perpendicular to the third conductive layer and the fifth conductive wall and connected to the eighth edge and the fifth conductive wall.

The electronic device may further include a PCB 860 including first to third conductive structures and an insulating material at least partially located between the first to third conductive structures.

The PCB 860 may include a plurality of conductive vias configuring at least a part of the first to fourth conductive walls.

The PCB 860 may include a plurality of stacked conductive strips, and an insulating material interposed between two immediately adjacent strips of the plurality of stacked strips, wherein the conductive strips may configure at least a part of the first to fourth conductive side walls together with the conductive vias.

The first conductive wall may be oriented to face a portion of the side member.

The electronic device may further include a second antenna structure having substantially the same structure as the first antenna structure, and the first antenna structure and the second antenna structure may be aligned along the portion of the side member.

An electronic device 300 may include a housing 310 including a first plate and a second plate; and a first antenna structure 800, wherein the first antenna structure includes a board 860 disposed between the first plate and the second plate and including a first surface facing the first plate and a second surface facing the second plate, wherein the board further includes a plurality of insulating layers stacked one on another between the first surface and the second surface, a first conductive layer 810 disposed on the first surface, a second conductive layer 890 disposed on the second surface, a plurality of strips disposed between the plurality of insulating layers, and a plurality of vias connecting at least some of the first conductive layer, the second conductive layer, or the plurality of strips to each other and disposed in the plurality of insulating layers; a first conductive structure 801, a second conductive structure 814, a third conductive structure 820, and a fourth conductive structure 830 constituted with the plurality of strips and the plurality of vias; and a wireless communication circuit 530 electrically connected to at least one of the vias and configured to transmit and/or receive at least one signal having a frequency of 3 GHz to 100 GHz. One edge of the first conductive layer may include a first notch portion 811, the first conductive structure may be perpendicular to the first conductive layer and may extend from one edge at which the first notch is disposed, the second conductive structure may be disposed to be spaced apart from the first notch portion and may be electrically connected to the wireless communication circuit, the third conductive structure may be spaced apart from the first notch portion and may be coupled with the first conductive layer so as to define a first cavity, and the fourth conductive structure may be surrounded by the third conductive structure and may be coupled with the first conductive layer so as to define a second cavity.

Each of the plurality of insulating layers may include a plurality of first conductive strips disposed in an area corresponding to the one edge of the first conductive layer, and a plurality of first vias connecting the plurality of first conductive strips.

Among the plurality of insulating layers, an insulating layer that is in contact with the first conductive layer is not provided with the first conductive strips or the first vias in an area corresponding to the first notch portion.

The first notch portion may be oriented to face an edge of the housing.

The electronic device may further include a second antenna structure having the same structure as the first antenna structure, and the first antenna structure and the second antenna structure may be aligned along the portion of the housing.

The second conductive layer may include a second edge 652 extending parallel to the first edge, a third edge 653 extending perpendicular to the second edge, a fourth edge 654 extending parallel to the third edge, and a fifth edge 655 extending parallel to the second edge, wherein the distance to the fifth edge from the first conductive wall is shorter than the distance to the second edge from the first conductive wall, and the second conductive layer may be disposed to face the first conductive layer and to overlap a portion of the first conductive layer.

The area of the second conductive layer may be smaller than that of the first conductive layer.

The plurality of vias may include first side conductive vias 821b connecting the first conductive layer and the second conductive layer and disposed along a portion of the third edge, third side conductive vias 823b disposed along at least a portion of the fourth edge, and second side conductive vias 822b disposed between the first side conductive vias and the third side conductive vias, and the plurality of strips may include first side conductive strips 821a disposed along a portion of the third edge, second side conductive strips 822a extending along at least a portion of the fourth edge, and third side conductive strips 823a disposed between the first side conductive strips and the second side conductive strips.

Each of the first side conductive vias, the second side conductive vias, and the third side conductive vias may be coupled with the first side conductive strips, the second side conductive strips, and the third conductive strips, respectively, so as to define a first cavity.

The plurality of conductive strips may further include a fifth side conductive strip 832a disposed to be spaced apart from the first side conductive strips, a sixth side conductive strip 833a disposed to be spaced apart from the third side conductive strips, and a fourth side conductive strip 831a configured to connect some of the fifth side conductive strips and some of the sixth side conductive strips to each other.

Among the plurality of insulating layers, an insulating layer on which the fourth side conductive strip is disposed and remaining insulating layers are distinguishable, and the remaining insulating layers may include an aperture between the fifth side conductive strip and the sixth side conductive strip.

The first cavity may generate resonance in a first frequency band, and the second cavity may generate resonance in a second frequency band that is relatively lower than the first frequency band.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:
1. An electronic device comprising:
a housing comprising a first plate that is directed outward in a first direction, a second plate that is directed outward in a second direction opposite to the first direction, and a side member that surrounds a space between the first and second plates;

a first antenna structure located in the space, wherein the first antenna structure comprises:

a first conductive structure comprising a first conductive layer, which is substantially parallel to the second plate and includes a first edge extending in a third direction perpendicular to the first direction and a first notch portion disposed at the first edge, and a first conductive wall, which is substantially perpendicular to the first conductive layer and includes a second notch portion extending from the first edge and connected to the first notch portion;

a second conductive structure located in the first notch portion and electrically isolated from the first conductive structure;

a third conductive structure located between the first conductive layer and the first plate and electrically isolated from the first conductive structure and the second conductive structure, wherein the third conductive structure comprises:

a second conductive layer facing the first conductive layer and having a quadrilateral shape, the second conductive layer comprising a second edge extending parallel to the first edge, a third edge extending perpendicular to the second edge, a fourth edge extending parallel to the third edge, and a fifth edge extending parallel to the second edge, wherein a distance to the fifth edge from the first conductive wall is shorter than a distance to the second edge from the first conductive wall, a second conductive wall facing the first conductive wall and extending from the second edge, a third conductive wall connected to the third edge and the second conductive wall and perpendicular to the second conductive layer and the second conductive wall, and a fourth conductive wall connected to the fourth edge and the second conductive wall and perpendicular to the second conductive layer and the second conductive wall; and a wireless communication circuit electrically connected to the second conductive structure and configured to transmit or receive a signal having a frequency of 3 GHz to 100 GHz.

2. The electronic device of claim 1, wherein the first conductive layer further includes a third notch portion further cut from the first notch portion, and the second conductive structure includes a conductive portion protruding into the third notch portion.

3. The electronic device of claim 1, wherein the first antenna structure further comprises a fourth conductive structure located between the first conductive structure and the third conductive structure, the fourth conductive structure comprising:

a third conductive layer facing the first conductive layer and including a sixth edge parallel to the first edge, a seventh edge extending perpendicular to sixth edge, an eighth edge extending parallel to the seventh edge, and a ninth edge parallel to the sixth edge, wherein a distance to the ninth edge from the first conductive wall is shorter than a distance to the sixth edge from the first conductive wall;

a fifth conductive wall facing the first conductive side wall and separated from the third conductive layer;

a sixth conductive wall perpendicular to the third conductive layer and the fifth conductive wall and connected to the seventh edge and the fifth conductive wall; and a seventh conductive wall perpendicular to the third conductive layer and the fifth conductive wall and connected to the eighth edge and the fifth conductive wall.

4. The electronic device of claim 1, further comprising a printed circuit board (PCB) comprising first to third conductive structures and an insulating material at least partially located between the first to third conductive structures, wherein the PCB comprises a plurality of conductive vias configuring at least a part of the first to fourth conductive side walls.

5. The electronic device of claim 4, wherein the PCB comprises a plurality of stacked conductive strips, and an insulating material interposed between two immediately adjacent strips of the plurality of stacked strips, and the conductive strips configure at least a part of the first to fourth conductive side walls together with the conductive vias.

6. The electronic device of claim 1, further comprising a second antenna structure having a same structure as the first antenna structure, wherein, the first conductive wall is oriented to face a portion of the side member, and the first antenna structure and the second antenna structure are aligned along the portion of the side member.

7. An electronic device comprising:

a housing comprising a first plate and a second plate; and a first antenna structure, wherein the first antenna structure comprises a board disposed between the first plate and the second plate, wherein the board comprises:

a first surface facing the first plate, a second surface facing the second plate, a plurality of insulating layers stacked on top of each other between the first surface and the second surface, a first conductive layer disposed on the first surface, a second conductive layer disposed on the second surface, a plurality of strips disposed between the plurality of insulating layers, and a plurality of vias connecting at least one or more of the first conductive layer, the second conductive layer, or the plurality of strips to each other and disposed in the plurality of insulating layers;

a first conductive structure, a second conductive structure, a third conductive structure, and a fourth conductive structure formed as part of the plurality of strips and the plurality of vias; and a wireless communication circuit electrically connected to at least one of the vias and configured to transmit or receive at least one signal having a frequency of 3 GHz to 100 GHz, wherein the first edge of the first conductive layer comprises a first notch portion, the first conductive structure is perpendicular to the first conductive layer and extends from one edge at which the first notch is disposed, the second conductive structure is disposed to be spaced apart from the first notch portion and is electrically connected to the wireless communication circuit, the third conductive structure is spaced apart from the first notch portion and coupled with the first conductive layer so as to define a first cavity, and the fourth conductive structure is surrounded by the third conductive structure and is coupled with the first conductive layer so as to define a second cavity.

8. The electronic device of claim 7, wherein each of the plurality of insulating layers comprises a plurality of first conductive strips disposed in an area corresponding to the one edge of the first conductive layer, and a plurality of first vias connecting the plurality of first conductive strips.

9. The electronic device of claim 8, wherein, among the plurality of insulating layers, an insulating layer that is in contact with the first conductive layer is not provided with the first conductive strips or the first vias in an area corresponding to the first notch portion.

10. The electronic device of claim 8, wherein the second conductive layer comprises a second edge extending parallel to the first edge, a third edge extending perpendicular to the second edge, a fourth edge extending parallel to the third edge, and a fifth edge extending parallel to the second edge, wherein a distance to the fifth edge from the first conductive wall is shorter than a distance to the second edge from the first conductive wall, and the second conductive layer faces the first conductive layer and is disposed to overlap a portion of the first conductive layer.

11. The electronic device of claim 10, wherein the plurality of vias comprise first side conductive vias connecting the first conductive layer and the second conductive layer and disposed along a portion of the third edge, third side conductive vias disposed along at least a portion of the fourth edge, and second side conductive vias disposed between the first side conductive vias and the third side conductive vias, and the plurality of strips include first side conductive strips disposed along a portion of the third edge, second side conductive strips extending along at least a portion of the fourth edge, and third side conductive strips disposed between the first side conductive strips and the second side conductive strips.

12. The electronic device of claim 11, wherein each of the first side conductive vias, the second side conductive vias, and the third side conductive vias are coupled with the first side conductive strips, the second side conductive strips, and the third conductive strips, respectively, so as to define a first cavity.

13. The electronic device of claim 12, wherein the plurality of conductive strips further comprise a fifth side conductive strip disposed to be spaced apart from the first side conductive strips, a sixth side conductive strip disposed to be spaced apart from the third side conductive strips, and a fourth side conductive strip configured to connect some of the fifth side conductive strips and some of the sixth side conductive strips to each other.

14. The electronic device of claim 13, wherein, among the plurality of insulating layers, an insulating layer on which the fourth side conductive strip is disposed and insulating layers on which the fourth side conductive strip is not disposed are distinguishable, and the insulating layers on which the fourth side conductive strip is not disposed define an aperture.

15. The electronic device of claim 7, wherein the first cavity generates resonance in a first frequency band, and the second cavity generates resonance in a second frequency band that is relatively lower than the first frequency band.

* * * * *